US012418136B2

(12) United States Patent
Corona

(10) Patent No.: US 12,418,136 B2
(45) Date of Patent: Sep. 16, 2025

(54) TWO-PIECE MOISTURE RESISTANT LOCKING CONNECTOR WITH MULTI PIN CONNECTION

(71) Applicant: DSM&T COMPANY INC., Fontana, CA (US)

(72) Inventor: Sergio Corona, Fontana, CA (US)

(73) Assignee: DSM&T COMPANY INC., Fontana, CA (US)

( * ) Notice: Subject to any disclaimer, the term of this patent is extended or adjusted under 35 U.S.C. 154(b) by 313 days.

(21) Appl. No.: 18/315,610

(22) Filed: May 11, 2023

(65) Prior Publication Data

US 2024/0195119 A1 Jun. 13, 2024

Related U.S. Application Data

(63) Continuation-in-part of application No. 18/062,971, filed on Dec. 7, 2022.

(51) Int. Cl.
*H01R 13/52* (2006.01)
*H01R 13/627* (2006.01)

(52) U.S. Cl.
CPC ..... *H01R 13/5202* (2013.01); *H01R 13/5219* (2013.01); *H01R 13/6272* (2013.01)

(58) Field of Classification Search
None
See application file for complete search history.

(56) References Cited

U.S. PATENT DOCUMENTS

| | | | | |
|---|---|---|---|---|
| 8,414,330 B2 * | 4/2013 | Yamada | H01R 13/4226 439/579 |
| 2022/0077633 A1 | 3/2022 | Provencher et al. | |
| 2024/0195119 A1 * | 6/2024 | Corona | H01R 13/5202 |
| 2024/0196119 A1 | 6/2024 | Corona | |

OTHER PUBLICATIONS

Deutsch Connectors, www.DeutschConnector.com; Copyright 2004-2022; downloaded from Internet on Dec. 7, 2022. https://www.deutschconnector.com/products/deutsch_connectors/.
Flange Mount Connectors; www.DeutschConnector.com; Copyright 2004-2022; downloaded from Internet on Dec. 7, 2022. https://www.deutschconnector.com/products/deutsch_connectors/deutsch_flange_mount_connectors/.
Canadian Examiner's Requisition dated Jan. 14, 2025 from corresponding Canadian Patent Application No. 3,208,186, 5 pages.

* cited by examiner

*Primary Examiner* — Tho D Ta
(74) *Attorney, Agent, or Firm* — Ruggiero McAllister & McMahon LLC

(57) ABSTRACT

A waterproof seal for electrical assemblies wherein at least two pins extend through the electrical conductor such that the at least two pins extending from a distal end of the electrical conductor and are adapted to interact with openings on a connecter that is detachably connectable with the distal end of the electrical connector, and the at least two pins extend from a proximal end of the electrical connector such that the at least two pins extending from the proximal end are adapted to be interact with openings in a socket formed in the surface of housing where the electrical connector forms a water tight barrier preventing water from entering the housing through the electrical connector or around the electrical connector.

32 Claims, 26 Drawing Sheets

TO BE FIXED

TWO-PIECE MOISTURE RESISTANT LOCKING CONNECTOR WITH MULTI PIN CONNECTION

FIELD OF THE INVENTION

The present invention relates to a waterproof electrical connector and more specifically, to a two-piece electrical connector that is designed to mate at one end with a Deutsch Connector and where the electrical connector is designed such that a second end is designed to mate with a receptacle and includes a plurality of seals including a detachable connector body that sits over top of the connector base and forms a cavity in which the Deutsch Connector is received.

BACKGROUND OF THE INVENTION

One challenge faced in the electrical lighting industry is the prevention of water intrusion into lighting fixtures and electronics. This is especially an issue for light fixtures designed to be in wet locations such as exterior lighting, areas with standing water, or automotive and marine applications. Lighting manufacturers go to great lengths to design weather tight enclosures to prevent water intrusion and various methods have been tried with limited success.

Many problems can arise when water gets into a light fixture or into electronics. One major problem is corrosion that can shorten the life of the light fixture or electronics. Other issues relate to safety, such as short-circuits and ground-faults, that can occur as the light fixture or electronics degrade. Still other issues include reduced performance for the equipment fed by the electrical conductors extending from a leaky electrical connector.

To deal with these issues, lighting manufacturers have sought to provide better moisture seals to completely seal off the interior space of light fixtures and electronics from the outside. While manufacturers have been successful in producing very tightly sealed light fixtures and electronics enclosures, this has still not prevented water incursion.

One type of electrical connector is known as a Deutsch Connector. Deutsch Connectors are environmentally sealed, waterproof electrical connectors designed for the transportation industry. The rugged thermoplastic housings operate in temperatures from −55° C. to 125° C. and include Silicone Rubber seals. Deutsch Connectors are available with a variable number of cavities depending on the application. An example of various Deutsch Connectors can be seen at https://www.deutschconnector.com/products/deutsch_connectors/.

In some configurations, Deutsch Connectors are provided as flange mounted connectors as can be seen at https://www.deutschconnector.com/products/deutsch_connectors/deutsch_flange_mount_connectors/. However, a major problem with flange mounted Deutsch Connectors is that they tend to break. In rugged environments, such as in the automotive industry, the plugging and unplugging of a Deutsch Connector can be difficult and requires a person to pull very hard to withdraw the male connector from the flange connector. Quite often, a person will wiggle the connector from side to side as they try to work the male connector loose from the flange body. This quite often leads to cracking of the flange body as they are formed as a single unitary piece typically made from a hard thermoplastic material. Additionally, for flange mounted connectors that are affixed to a surface, if the screws that hold the Deutsch Connector are over-tightened, this too can crack the flange connector.

It should be noted that the Deutsch Connector has been specifically selected to be formed with a single unitary structure formed of thermoplastic material. This is important because this construction limits the water intrusion points for the connector.

When a Deutsch Connector is damaged, the entire flange connector body needs to be removed and replaced. This typically involves removing the flange connector body from the surface it is connected to, pulling the wires through the opening, and then cutting the wires that have previously been soldered to the equipment leads (e.g., light fixture, electronics equipment, etc.). Non-soldered connections are typically not acceptable because of the ruggedness of the environment. For example, if the application is a light bar on a vehicle, the vibration of the vehicle when being driven will cause connections such as wire nuts to come loose causing the equipment to malfunction. Accordingly, replacing a broken Deutsch Connector is a time and labor-intensive process.

Additionally, the lamps used in some types of light fixtures can generate a significant amount of heat. When heat is generated by the lamp, it functions to heat the surrounding air inside the sealed light fixture, which in turn causes the air to expand. However, in light fixtures with very tight seals, the heated air is unable to easily escape the interior of the fixture and therefore the expanding air increases the air pressure inside the fixture. The pressurized air inside the light fixture then seeks equilibrium with the lower pressure air outside the fixture using any pathway available. One pathway is the air space inside the electrical cables (the space between the electrical conductor strands and space between the electrical conductors and the surrounding insulation). The result has been that air inside the fixture passes through the electrical cable and escapes the interior of the light fixture through the electrical fittings. However, while escaping air is not necessarily problematic, when the light fixture is turned off and the lamp inside cools down, the air inside the light fixture also cools down and contracts causing a negative pressure to develop inside the light fixture. The negative pressure functions to draw air and moisture into the light fixture through the same path that air escaped, namely, via the electrical cable and fittings. When using a Deutsch Connector, the pathway extends through the male connector and through the connector body itself. Over time, the repeated cycles of heating and cooling can cause a significant amount of moisture to be drawn into the light fixture. This moisture in turn, is subject to the heating and cooling when the light fixture turns on/off, which leads to condensation throughout the light fixture leading to accelerated corrosion, degradation, and eventual premature failure of the equipment.

SUMMARY OF THE INVENTION

What is desired then is an electrical connector that can be mounted to a surface that prevents water from passing through the electrical connector.

It is also desired to provide an electrical connector that can be mounted to a surface that resists breaking or cracking of the electrical connector.

It is further desired to provide an electrical connector that can be mounted to a surface that is provided as a two-piece structure where the portion of the connector that forms a cavity is detachable from the portion that is mounted to the surface.

It is still further desired to provide an electrical connector that can be mounted to a surface that is resistant to breakage and is adapted to receive a Deutsch Connector.

It is also desired to provide a watertight electrical connector that comprises a two-piece structure that reduces the time and difficulty of assembly.

It is also desired to provide an electrical connector that can be plugged directly into a socket provided in the surface of a light fixture where the electrical connector provides a watertight seal in and around the socket and through the interior of the electrical connector.

In one configuration an electrical connector is provided that is insertable into a socket, which may be provided in the housing of a light fixture. The electrical connector may be formed as a two-piece connector comprising a connector base and a connector body. In one configuration, the connector base is formed of an elastic material, while the connector body that is adapted to sit on top of the connector base is formed of a rigid metal material.

The connector base, in one configuration, is formed as a single integral piece and is formed having a body portion and a flange section. The body portion is adapted to be inserted into an opening formed in a surface (e.g., into a socket formed in a housing), which could be, for example, a housing of a light fixture or a mounting surface in a vehicle engine compartment. The body portion may in one configuration, be provided with a series of ridges or raised portions extending circumferentially around the body portion. When inserted into the opening/socket, the series of ridges or raised portions interact with an interior surface of the opening/socket forming a seal preventing the ingress of water through the opening. In one configuration, pins may extend from the body portion that are designed to interact with corresponding receptacles in the socket. The pins may be formed of a conductive material and are sealed around the end of the body portion preventing water from passing through or around the edges of the pins.

The connector base may further comprise a flange section that is wider than the body portion where the flange section interacts with the surface surrounding the opening (e.g., the surface of the housing) allowing the connector base to be securely attached to the housing. In one configuration, the flange section may be provided with two openings each opposite to each position outward from the body portion and adapted to receive a fastening member, such as a screw or the like that can secure the electrical connector in the socket preventing accidental removal of the electrical connector.

The connector body, in one configuration, is formed as a single integral piece and is formed having a flange portion and a raised section. The flange portion of the connector body is adapted to interact with the flange section of the connector base. The flange portion and the flange section interact with each other such that multiple seals are formed preventing water from passing from between the flange portion and the flange section. The flange portion of the connector body is further provided in one configuration with two openings corresponding to the two openings in the flange section allowing respective fastening members to pass through both the flange section and the flange portion. When the fastening members are tightened, the flange portion is compressed onto the flange section, which in turn is compressed to the surface.

The connector body further includes a raised section that forms a cavity. The cavity is adapted to receive a male connector that in one configuration comprises, a Deutsch Connector. The connector body may, in one configuration, be formed from aluminum. Additionally, the raised section is formed with a locking mechanism adapted to interact with an arm associated with a male connecter. The locking mechanism may comprise at least one opening in the raised section adapted to receive a protrusion on the arm. In practice, when the male connector is inserted into the cavity, the protrusion on the arm will contact an inner surface of the cavity causing the arm to deflect inward. When the male connector is fully advanced into the cavity, the protrusion axially aligns with the at least one opening allowing the arm to deflect outward such that the protrusion extends through the at least one opening. This in turn, locks the male connector into the cavity preventing accidental removal of the male connector from the electrical connector.

It should further be noted that the connector base and the connector body are keyed such that the connector body can only be attached to the connector base in one direction ensuring that the electrical connector forms a proper seal between the two pieces. Likewise, the socket is keyed so that the electrical connector can only be inserted into the socket in the correct orientation.

It will further be understood by those of skill in the art that any number of pins may be provided in the electrical connector (e.g., 2 pins, 3 pins, 4 pins, etc.), which would further include corresponding electrical conductors. The pins in the connector body will correspond to the pins extending from the connector base that are designed to engage with receptacles positioned in the socket. The pins may be provided that extend completely through the electrical connector. For example, the pins may extend from a distal end of the electrical connector (e.g., in the cavity of the Deutsch Connector), they may extend through the electrical connector, and extend from a proximal end of the electrical connector (e.g., designed to engage with a socket in the housing of a light fixture). This configuration simplifies the assembly process as there is no soldering to perform and there are no wires to feed through internal openings in the electrical connector. The pins are provided as a single unitary structure as indicated in the Figures and may include a seat having a shoulder designed to hold the pins in a predefined position within the electrical connector.

In one configuration the receptacles at the bottom end of the socket may be coupled to a circuit board such that when the electrical connector is inserted in the proper orientation into the socket, the pins extending from the connector base align with and engage with corresponding receptacles as the electrical connector is advanced into the socket. Once the electrical connector is fully advanced into the socket, the flange portion of the connector base will sit flat against a surface of the light fixture housing with the pins fully advanced into the receptacles. Additionally, a seal is formed on an undersurface of the flange between the connector base and the surface of the housing. Additional seals are provided by the series of ridges or raised portions extending circumferentially around the insertion portion that interact with the interior surface of the socket forming a series of seals.

In one configuration, the internal structure of the electrical connector is described. Electrical conductors extend through the base portion connecting at a distal end to the pins extending from an upper surface of the base section and at a proximal end to the pins extending from a bottom surface of the base section. The electrical conductors, which may comprise copper stranded conductors, may be coupled to the sets of pins via a solder connection inside the body portion. The electrical conductors may have the electrical insulation surrounding the electrical conductors removed from the ends of the electrical conductors and for a longitudinal distance, such as but not limited to, 1 inch. Solder may be applied to the ends of the electrical conductors to bond the electrical conductors to the pins. Additionally, the solder may be applied to the stranded conductors over the area where the insulation has been removed (i.e., the electrical insulation could be completely removed from the conductors inside the connector base). This effectively converts the stranded conductors to solid conductors for that section of the wire. The interior of the base portion can then be filled with an epoxy surrounding the ends of the pins, the solder joints, and the portion of the electrical conductors within the base portion. This configuration will effectively prevent any water from traveling along the electrical conductors as the solid portions of the electrical conductors will prevent water from passing through spaces between the stranded wires and the epoxy will prevent any water from traveling along a surface of the soldered electrical conductors.

For this application the following terms and definitions shall apply:

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

In one configuration watertight electrical connector is provided comprising, a connector base including: a body portion adapted to be inserted into an opening of a surface and forming a seal between an inner surface of the opening and an exterior surface of the body portion, and a flange section adapted to engage with the surface and having at least one hole adapted to receive a fastening member. The electrical connector further comprises, a connector body having: a flange portion adapted to interact with the flange section and form a seal between the connector body and the connector base, the flange portion having at least one opening adapted to receive the fastening member, and a raised section forming a cavity adapted to receive a male connector. The electrical connector further comprises at least two conductors entering a proximal end of the body portion and coupled to corresponding pins mounted on the flange section. The electrical connector also comprises, a spacer having at least two openings therein to allow the at least two conductors to past through, the spacer inserted into the body portion to fill an internal space of the body portion, the spacer forming a seal between an outer surface of the spacer and an inner surface of the body portion, and an epoxy applied to at least a portion of the internal space such that the epoxy creates a seal preventing water from traveling through the body portion. The electrical connector is provided such that the connector body is detachably connectable with the body portion.

In another configuration a watertight electrical connector is provided comprising, a connector base including: a body portion adapted to be received in an opening of a surface and adapted to form a first seal between an inner surface of the opening and an exterior surface of the body portion, and a flange section having a raised area and a shoulder each positioned on a distal surface of the flange section, the flange section adapted to engage with the surface. The electrical connector further comprises, a connector body having: a flange portion having a shoulder and an upstanding wall extending around a perimeter of the flange portion, and a raised section forming a cavity adapted to receive a male connector. The electrical conductor is provided such that the raised area on the distal surface of the flange section interacts with the shoulder of the flange portion such that a second seal is formed between the cavity and the distal surface. The electrical conductor is also provided such that the upstanding wall of the flange portion interacts with the shoulder of the flange section to form a third seal between the flange portion and the flange section. The electrical connector further comprises at least two conductors entering a proximal end of the body portion and coupled to corresponding pins mounted on the raised area. The electrical connector also comprises, a spacer having at least two openings therein to allow the at least two conductors to pass through, the spacer inserted into the body portion to fill an internal space of the body portion, the spacer forming a fourth seal between an outer surface of the spacer and an inner surface of the body portion, and an epoxy applied to at least a portion of the internal space such that the epoxy creates a fifth seal preventing water from traveling through the body portion. The electrical conductor is still further provided such that the connector body is detachably connectable with the body portion.

Other objects of the invention and its features and advantages will become more apparent from consideration of the following drawings and accompanying detailed description.

DETAILED DESCRIPTION OF THE INVENTION

Figure 1:
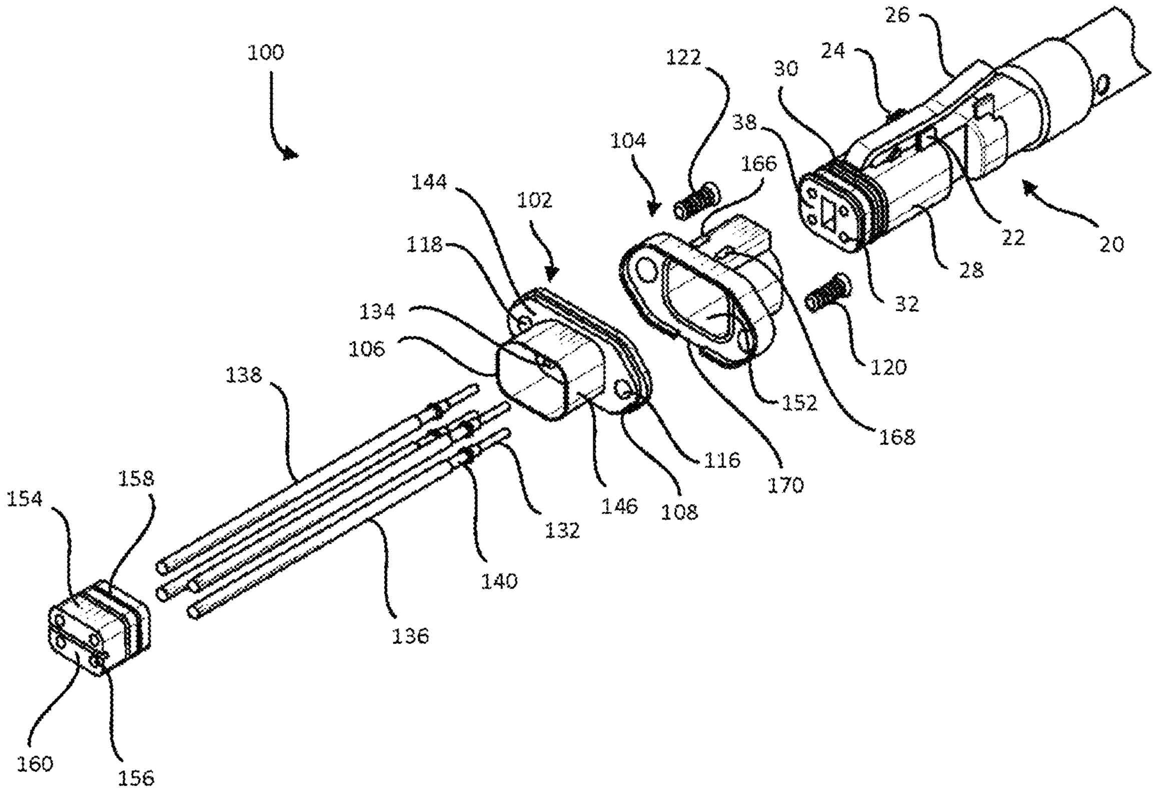
FIG. 1 is an exploded view of an electrical connector utilizing a four-pin configuration according to one configuration of the invention.

Referring now to the drawings, wherein like reference numerals designate corresponding structure throughout the views.

FIG. 1 is an exploded view of the electrical connector 100 according to one configuration of the invention. The electrical connector 100 comprises a connector base 102 and a connector body 104. The connector body 104 is detachable from the connector base 102 as shown in FIG. 1.

The connector base 102 is made from an elastic material, such as, a thermal plastic rubber (TPR), neoprene, thermoplastics elastomers (TPE), silicon, flexible polyvinyl chloride (PVC), and the like.

Figure 2:
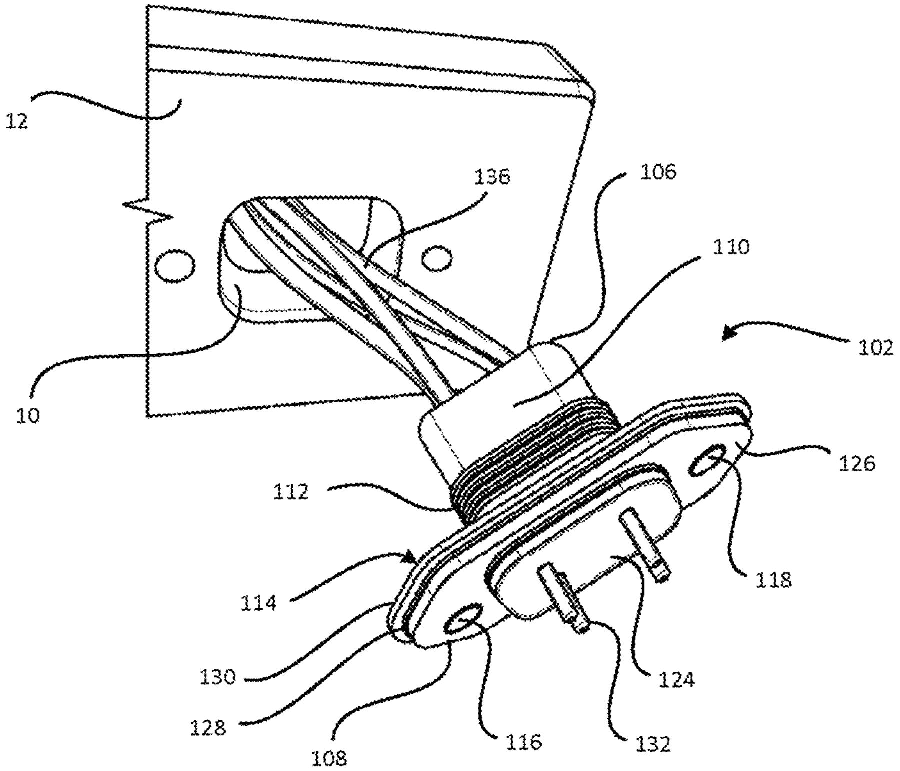
FIG. 2 is a perspective view of the connector base according to FIG. 1.
Figure 3:
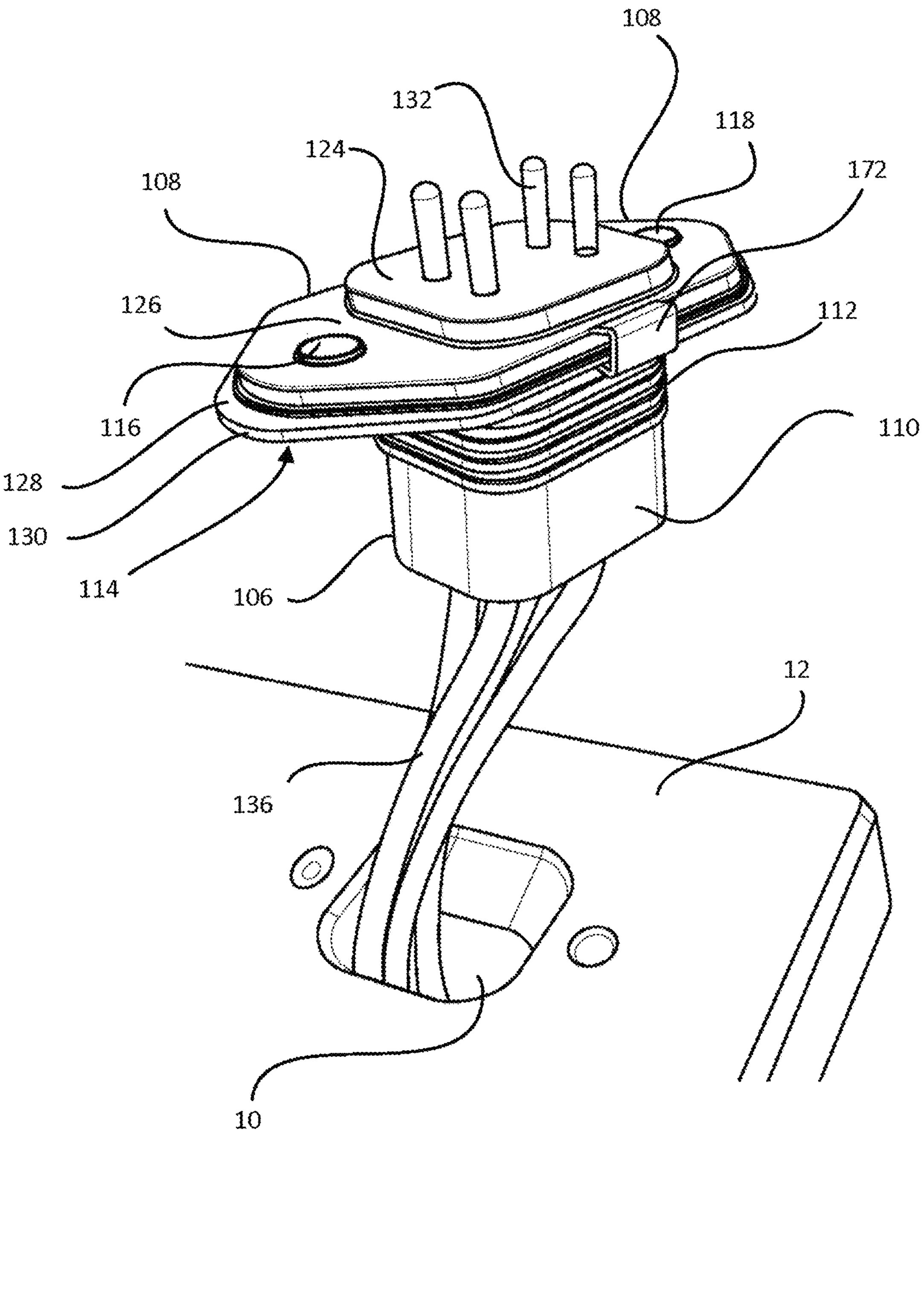
FIG. 3 is another perspective view of the connector base according to FIG. 1.

The connector base 102 is designed to fit into an opening 10 of a surface 12 as shown in FIGS. 2 & 3. A generic surface is shown in the drawings to illustrate how the electrical connector 100 can be affixed to a surface 12.

The connector base 102 comprises a body portion 106 and a flange section 108, which can variously be seen in FIGS. 1-3. Body portion 106 has an exterior surface 110, that includes a series of upstanding ridges 112. The upstanding ridges 112 are formed of the elastic material and are designed to be slightly larger in diameter than the opening 10 such that they deform when the body portion 106 is inserted into the opening 10 forming a first seal for the electrical connector 100. While five upstanding ridges 112 have been used in the current example, it is contemplated the fewer or more may be used depending on the application.

Figure 4:
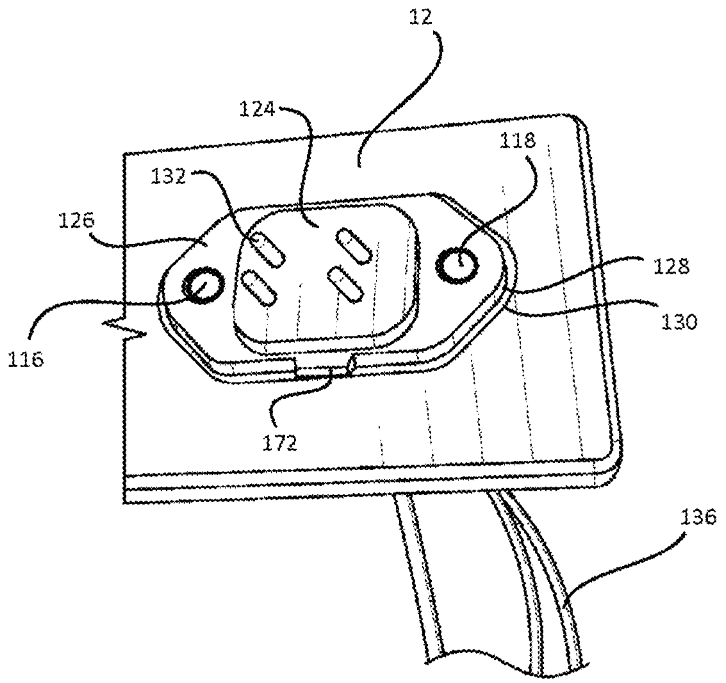
FIG. 4 is a front view of the connector base mounted to a surface according to FIG. 1.

The connector base 102 also includes flange section 108 that is formed having a perimeter larger than the body portion 106. The flange section 108 includes a contact surface 114 that is designed to lay flat against surface 12 (FIGS. 3 & 4). Additionally, flange section 108 is formed having two elongated sections opposite each other having holes 116, 118 formed therein for receiving fastening members 120, 122 respectively as shown in FIG. 1.

The flange section 108 also includes a raised area 124 on an upper surface 126 of the flange section 108. The raised area 124 forms a step at a perimeter of the raised area 124. Also shown in FIGS. 2-4 are pins 132, which extend from holes 134 in the raised area 124.

The flange section 108 further includes a shoulder 128 formed around a perimeter 130 of the flange section 108. Shoulder 128 is formed as a step as can be seen in FIGS. 1-3.

In one configuration, the entire connector base 102 is formed as a single integral piece of elastic material.

The connector base 102 and the connector body 104 are keyed such that the connector body 104 can only be attached to the connector base 102 in one direction ensuring that the electrical connector 100 forms a proper seal between the two pieces. The connector body 104 includes a key 170 that is designed to interact with a corresponding key 172 formed on connector base 102.

Electrical conductors 136, which may comprise copper (Cu) stranded conductors, are connected to pins 132. In one configuration, the connection between the electrical conductors 136 and pins 132 is formed by soldering. Also shown is an area where electrical insulation 138 is removed from the electrical conductors 136 to form a section of bare wire 140. The bare wire may have a solder applied to it so that the section of bare wire effectively becomes a "solid" wire where the solder is applied. The pins 132, extend through openings 134 to extend substantially perpendicular to the raised area 124, and the area of "solid" wire and the location where the electrical conductor 136 is soldered to the end of the pin 132 is positioned within the interior of the body portion 106.

Also shown in FIG. 1 is spacer 154 that includes openings 156 designed to receive electrical conductors 136. The exterior surface of spacer 154 includes a series of upstanding ridges 158 that are designed to interact with an inner surface of a cavity (not shown) in body portion 106. Spacer 154 comprises the elastic material as described in connection with connector base 102. The electrical conductors are threaded through the openings 156 with the pins 132 extending therefrom. Spacer 154 is then inserted into the cavity (not shown) in body portion 106 such that the pins 132 are threaded through openings 134 of raised area 124.

Figure 5:
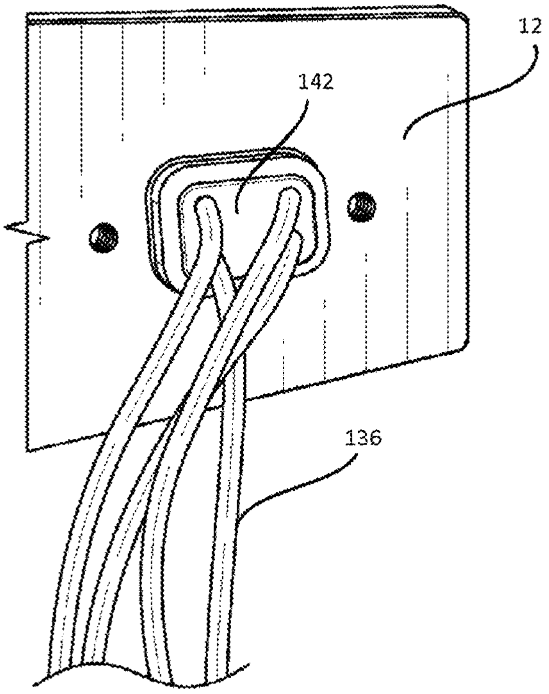
FIG. 5 is a rear view of the connector base mounted to a surface according to FIG. 1.

In one configuration, an epoxy 142 (FIG. 5) may be applied to the interior space of the body portion 106 to completely fill up any space left around the ends of the pins, the soldered joint, the "solid" wire, and the transition to the stranded wire. Additionally, epoxy 142 may be applied to completely cover the end 160 of spacer 154.

The epoxy may be selected as a thermal conductive epoxy with high electrical resistance characteristics. In this way, water is completely prevented from traveling through the body portion 106 whether through or around the electrical conductors 136, or around the pins 132.

Figure 6:
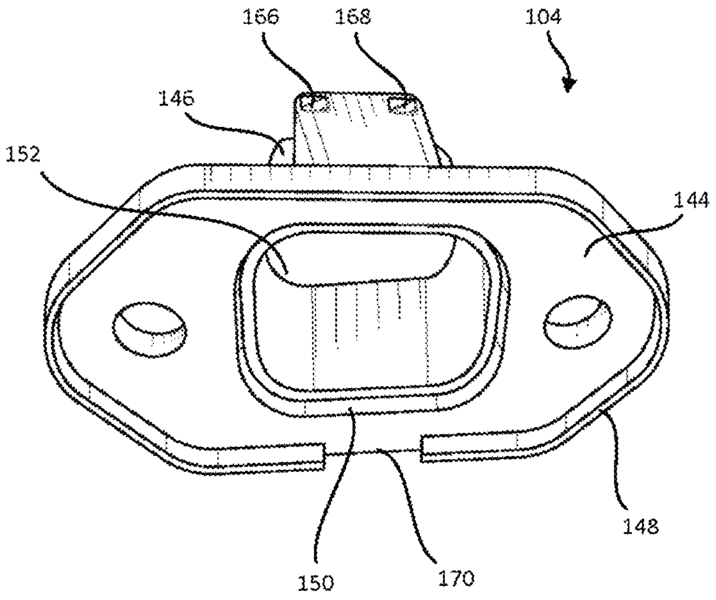
FIG. 6 is a rear view of the connector body according to FIG. 1.
Figure 7:
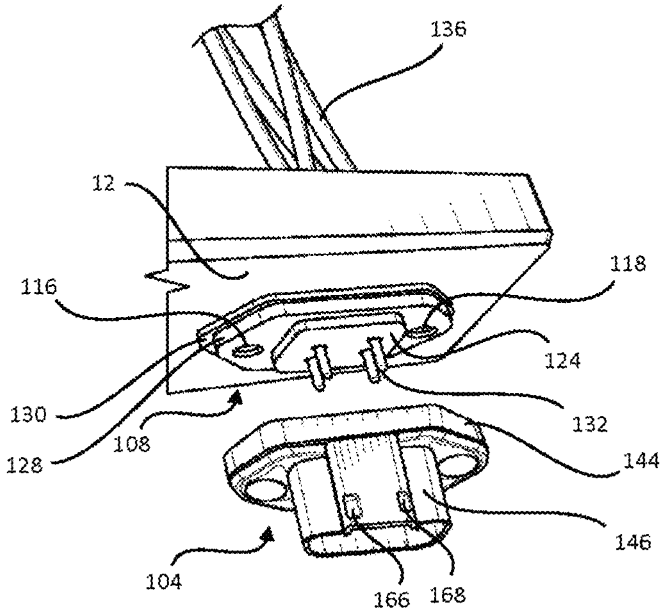
FIG. 7 is a perspective view of the connector base mounted to a surface and the connector body according to FIG. 1.
Figure 8:
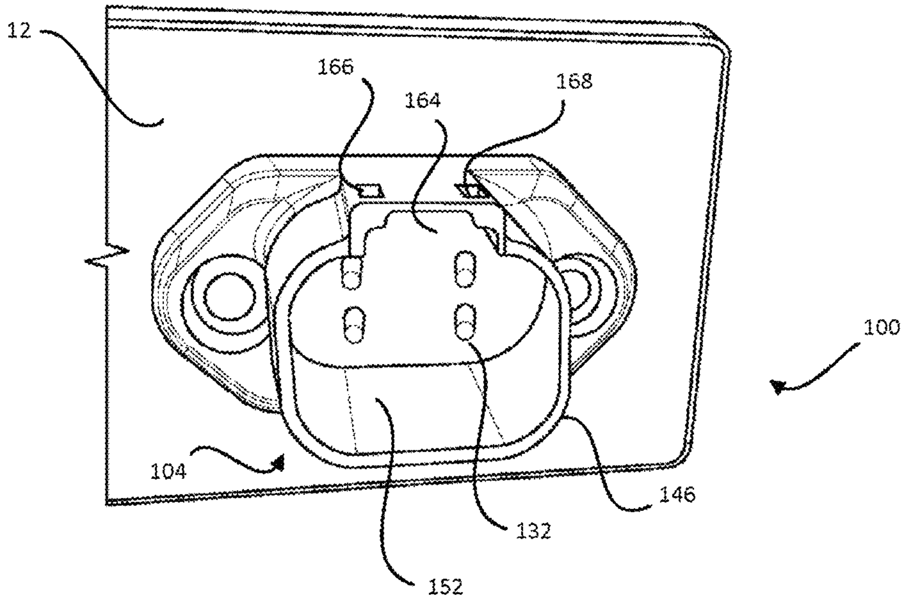
FIG. 8 is a front view of the electrical connector mounted to a surface according to FIG. 1.
Figure 9:
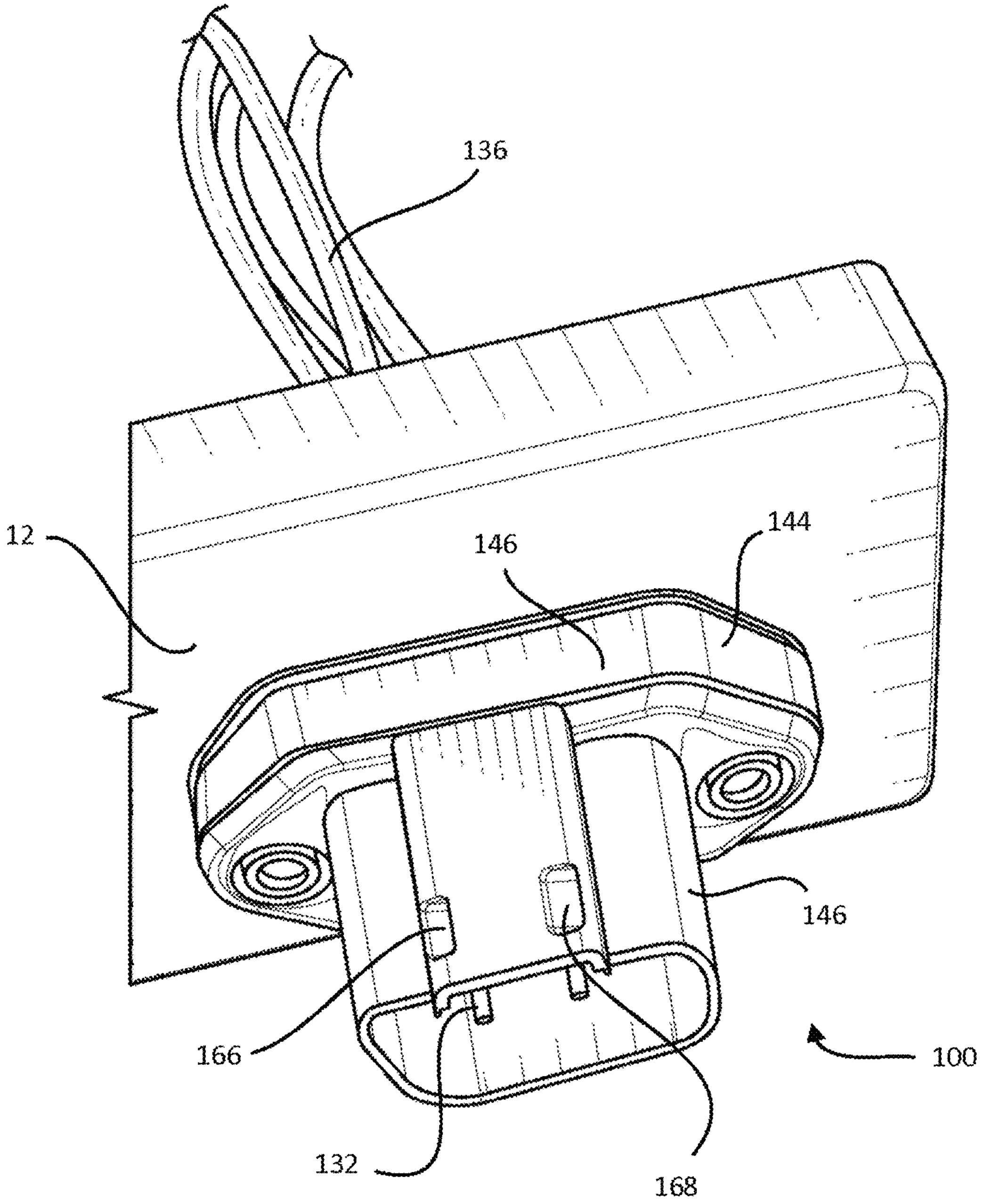
FIG. 9 is a perspective view of the electrical connector mounted to a surface according to FIG. 8.

Referring now to FIGS. 1 & 6-9, connector body 104 is variously illustrated. As indicated in FIGS. 1, 6 & 7, the connector body 104 is detachable from the connector base 102. In one configuration, the connector body 104 is formed of aluminum, however, it is contemplated that other metal materials may effectively be utilized.

The connector body 104 comprises a flange portion 144 and a raised section 146. The flange portion 144 has a perimeter that is essentially equal to the perimeter of the flange section 108 and is designed to sit on top of the flange section 108.

Referring now to FIG. 6, an upstanding wall 148 extends around the perimeter of flange portion 144. When the flange portion 144 is fit over top of the flange section 108, the upstanding wall 148 interacts with the shoulder 128 to form a second seal around an outer edge of connector base 102 and connector body 104 for the electrical connector 100.

Also illustrated in FIG. 6 is shoulder 150 extends around a proximal end of a cavity 152 formed by raised section 146. When the flange portion 144 is fit over top of the flange section 108, an outer edge of raised area 124 interacts with shoulder 150 to form a third seal between an outer edge of the cavity 152 of raised section 146 and the and the outer edge of raised area 124 of flange section 108 for the electrical connector 100.

A locking mechanism (FIGS. 1, 6 & 8) is variously illustrated comprising a channel 164 formed in the raised section 146, which is provided with two openings 166, 168, provided therein. These two openings 166, 168 may be provided as elongated channels and are designed to interact with two protrusions 22, 24 formed on an arm 26 provided on a male connector 20.

The male connector 20 may be provided with an exterior surface 28 that may include at least one or more O-ring(s) 30 that can interact with an interior surface of cavity 152 formed by raised section 146. Arm 26 is designed to engage with channel 164 formed in the raised section 146. When the male connector 20 is fully advanced into electrical connector 100, the protrusions 22, 24 will interlock with openings 166, 168 for a lock such that the male connector 20 cannot be withdrawn without pressing downward on arm 26 to disengage the protrusions 22, 24 from openings 166, 168.

An end face 38 of male connector 20 is provided with four receptacles 32 that are designed to receive pins 132. In this configuration, there are four pins 132 and four corresponding receptacles 32.

Figure 10:
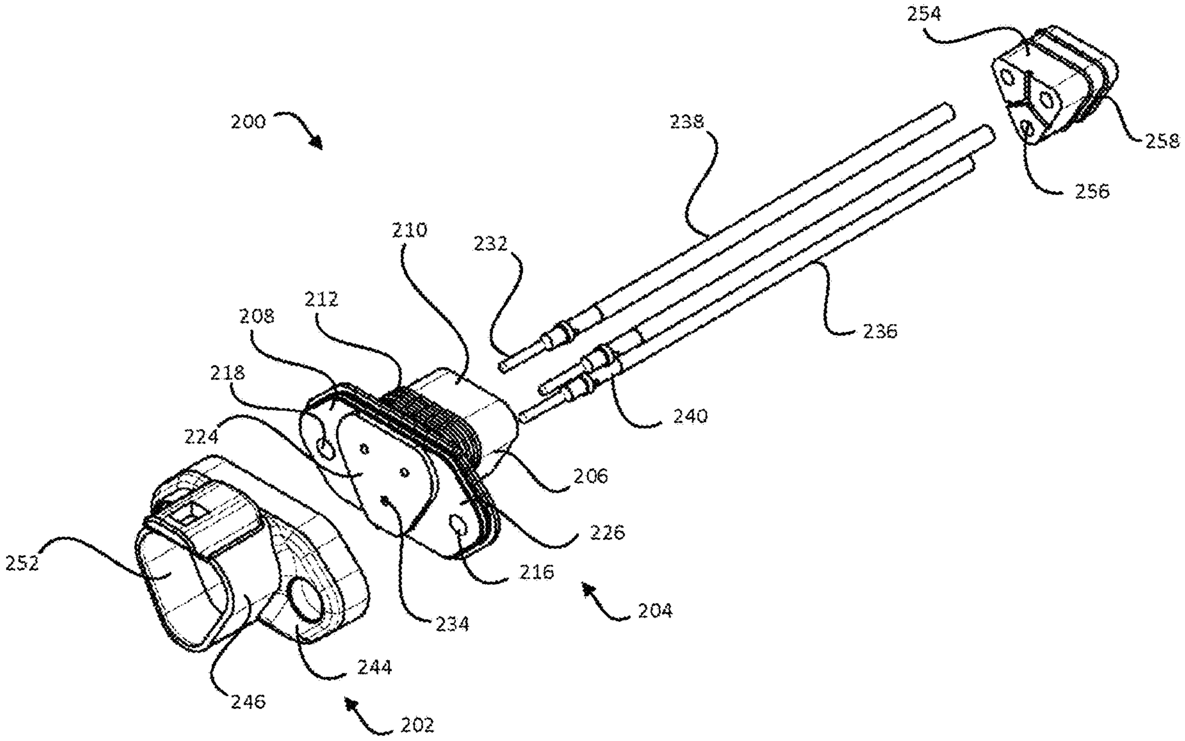
FIG. 10 is an exploded view of an electrical connector utilizing a three-pin configuration according to one configuration of the invention.

Referring to FIG. 10, an exploded view of the electrical connector 200 according to one configuration of the invention is presented. The electrical connector 200 comprises a connector base 202 and a connector body 204. The connector body 204 is detachable from the connector base 202 as shown in FIG. 10.

The connector base 202 may comprise an elastic material as described in connection with the 4-pin configuration previously described.

Figure 12:
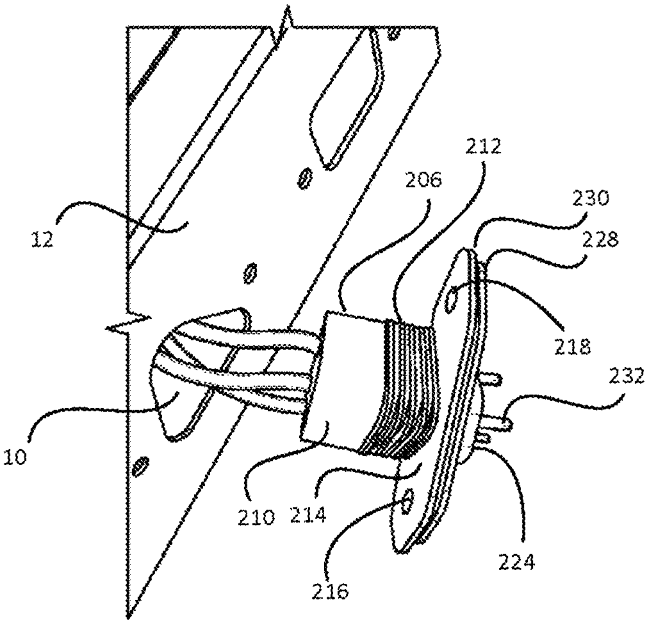
FIG. 12 is another perspective view of the connector base according to FIG. 10.
Figure 16:
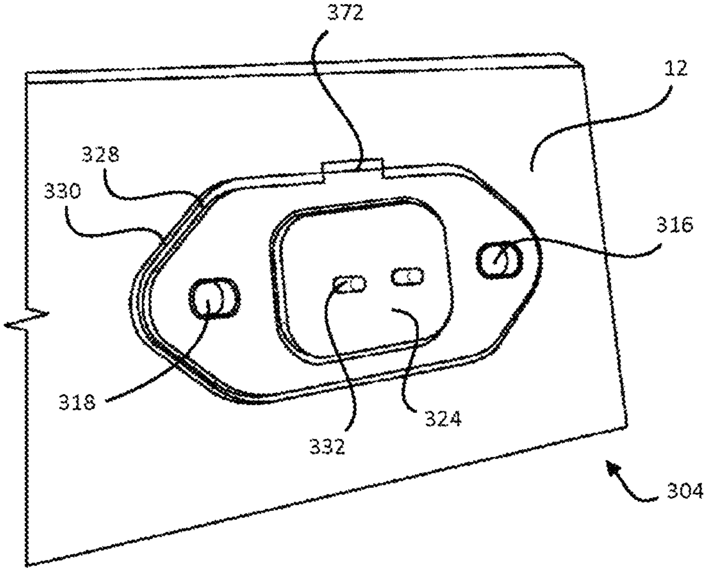
FIG. 16 is a front perspective view of the connector base mounted to a surface according to FIG. 15.
Figure 18:
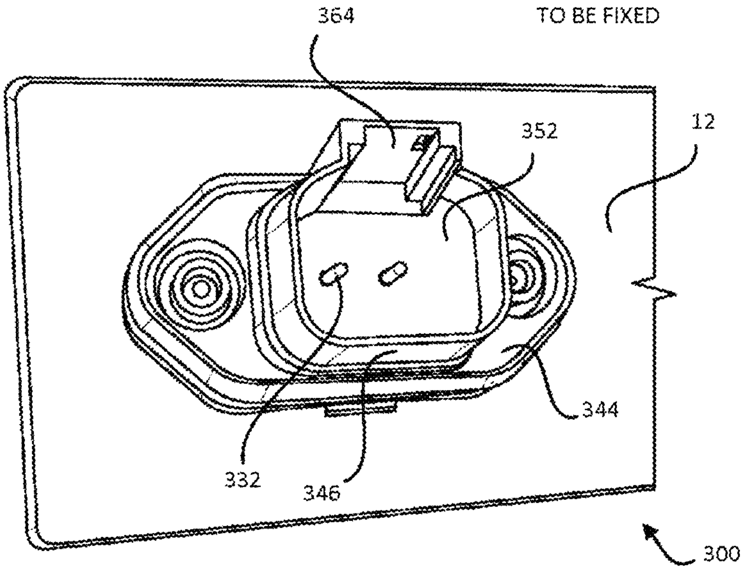
FIG. 18 is a front perspective view of the electrical connector mounted to a surface according to FIG. 15.

The connector base 202 is designed to fit into an opening 10 of a surface 12 as shown in FIGS. 12, 16 & 18. A generic surface is shown in the drawings to illustrate how the electrical connector 200 can be affixed to a surface 12.

Figure 11:
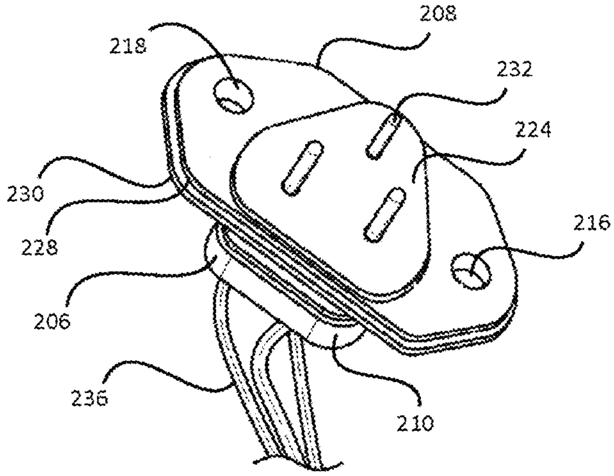
FIG. 11 is a perspective view of the connector base according to FIG. 10.

Connector base 202 comprises a body portion 206 and a flange section 208, which can variously be seen in FIGS. 11 & 12. Body portion 206 has an exterior surface 210, that includes a series of upstanding ridges 212. The upstanding ridges 212 are formed of the elastic material and are designed to be slightly larger in diameter than the opening 10 such that they deform when the body portion 206 is inserted into the opening 10 forming a first seal for the electrical connector 200. While five upstanding ridges 212 have been used in the current example, it is contemplated the fewer or more may be used depending on the application.

Figure 14:
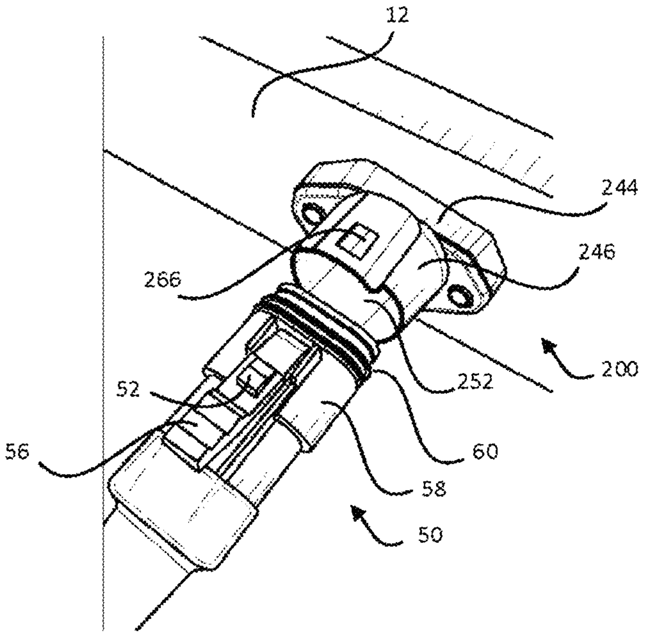
FIG. 14 is a perspective view of a male connector that can be inserted into the electrical connector according to FIG. 10.

The connector base 202 also includes flange section 208 that is formed having a perimeter larger than the body portion 206. Flange section 208 includes contact surface 214 that is designed to lay flat against surface 12 (FIG. 14). Additionally, flange section 208 is formed having two elongated sections opposite each other having holes 216, 218 formed therein for receiving fastening members (not shown).

Flange section 208 also includes a raised area 224 on an upper surface 226 of the flange section 208. The raised area 224 forms a step at a perimeter of the raised area 224. Also shown in FIGS. 10 & 11 are pins 232, which extend from holes 234 in the raised area 224.

Flange section 208 further includes shoulder 228 formed around a perimeter 230 of the flange section 208. The shoulder 228 is formed as a step as can be seen in FIGS. 10-12.

In one configuration, the entire connector base 202 is formed as a single integral piece of elastic material.

The connector base 202 and the connector body 204 are keyed such that the connector body 204 can only be attached to the connector base 202 in one direction ensuring that the electrical connector 200 forms a proper seal between the two pieces. The keys are similar to those described in connection with the four-pin configuration.

Electrical conductors 236 may comprise copper and may further include a soldered section as previously described. In one configuration, the connection between the electrical conductors 236 and pins 232 is formed by soldering. Also shown is an area where electrical insulation 238 is removed from the electrical conductors 236 to form a section of bare wire 240. The bare wire may have a solder applied to it so that the section of bare wire effectively becomes a "solid" wire where the solder is applied. The pins 232, extend through openings 234 to extend substantially perpendicular to the raised area 224, and the area of "solid" wire and the location where the electrical conductor 236 is soldered to the end of the pin 232 is positioned within the interior of the body portion 206.

Also shown in FIG. 10 is spacer 254 that includes openings 256 designed to receive electrical conductors 236. The exterior surface of spacer 254 includes a series of upstanding ridges 258 that are designed to interact with an inner surface of a cavity (not shown) in body portion 206. Spacer 254 comprises the elastic material as described in connection with connector base 202. The electrical conductors are threaded through the openings 256 with the pins 232 extending therefrom. Spacer 254 is then inserted into the cavity (not shown) in body portion 206 such that pins 232 are threaded through openings 234 of raised area 224.

In one configuration, an epoxy which may comprise a material as previously described, may be applied to the interior space of the body portion 206 to completely fill up any space left around the ends of the pins, the soldered joint, the "solid" wire, and the transition to the stranded wire. Additionally, the epoxy may be applied to completely cover the end of spacer 254.

Referring now to FIGS. 10, 13, 18 & 19, connector body 204 is variously illustrated. The connector body 204 is detachable from connector base 202. In one configuration, connector body 204 is formed of aluminum, however, it is contemplated that other metal materials may effectively be utilized.

Connector body 204 comprises a flange portion 244 and a raised section 246. The flange portion 244 has a perimeter that is essentially equal to the perimeter of flange section 208 and is designed to sit on top of flange section 208.

Figure 13:
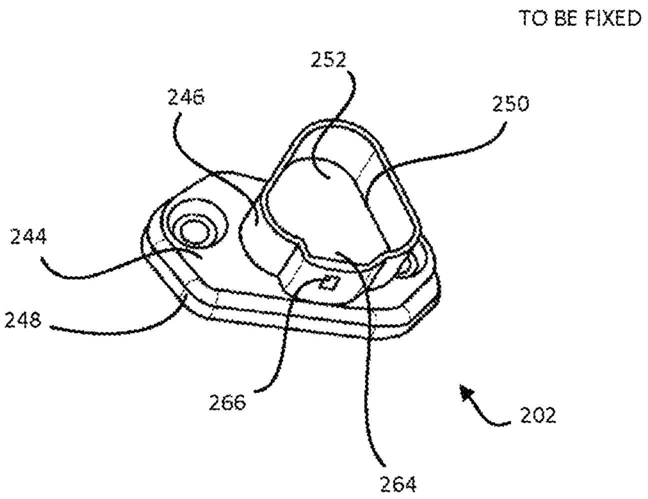
FIG. 13 is a perspective view of the connector body according to FIG.

Referring now to FIG. 13, an upstanding wall 248 extends around the perimeter of flange portion 244. When the flange portion 244 is fit over top of the flange section 208, the upstanding wall 248 interacts with the shoulder 228 to form a second seal around an outer edge of connector base 202 and connector body 204 for the electrical connector 200.

Also illustrated in FIG. 6 is shoulder 250 extends around a proximal end of cavity 252 formed by raised section 246. When the flange portion 244 is fit over top of the flange section 208, an outer edge of raised area 224 interacts with shoulder 250 to form a third seal between an outer edge of the cavity 252 of raised section 246 and the and the outer edge of raised area 224 of flange section 208 for the electrical connector 200.

A locking mechanism (FIGS. 13, 14) is variously illustrated comprising a channel 264 formed in the raised section 246, which is provided with an opening 266, provided therein. These opening 266 may be provided as elongated channels and are designed to interact with protrusion 52 formed on an arm 56 provided on a male connector 50.

The male connector 50 may be provided with an exterior surface 58 that may include at least one or more O-ring(s) 60 that can interact with an interior surface of cavity 252 formed by raised section 246. Arm 56 is designed to engage with channel 264 formed in the raised section 246. When the male connector 50 is fully advanced into electrical connector 200, the protrusion 52 will interlock with opening 266 to lock such that the male connector 50 cannot be withdrawn without pressing downward on arm 56 to disengage the protrusion 52 from opening 266.

An end face (not shown) of male connector 50 is provided with three receptacles (not shown) that are designed to receive pins 232.

Figure 15:
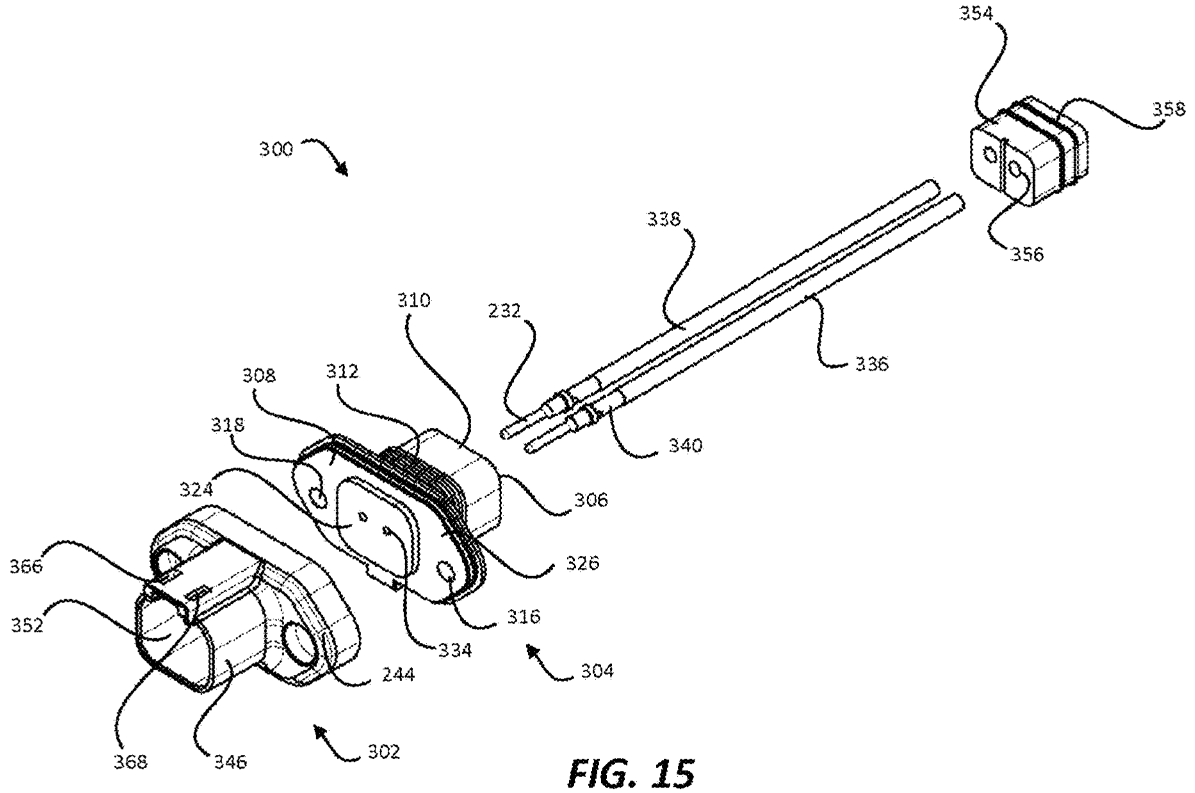
FIG. 15 is an exploded view of an electrical connector utilizing a two-pin configuration according to one configuration of the invention.

FIG. 15 is an exploded view of the electrical connector 300 according to one configuration of the invention. The electrical connector 300 comprises a connector base 302 and a connector body 304. The connector body 304 is detachable from the connector base 302 as shown in FIG. 15.

The connector base 302 may comprise an elastic material as described in connection with the 4-pin configuration previously described.

The connector base 302 is designed to fit into an opening of a surface as previously described in connection with the four-pin and three-pin versions.

The connector base 302 comprises a body portion 306 and a flange section 308, which can variously be seen in FIGS. 1-3. The body portion 306 has an exterior surface 310, that includes a series of upstanding ridges 312. The upstanding ridges 312 are formed of the elastic material and are designed to be slightly larger in diameter than the opening in which they are inserted such that they deform when the body portion 306 is inserted into the opening forming a first seal for the electrical connector 300.

Figure 19:
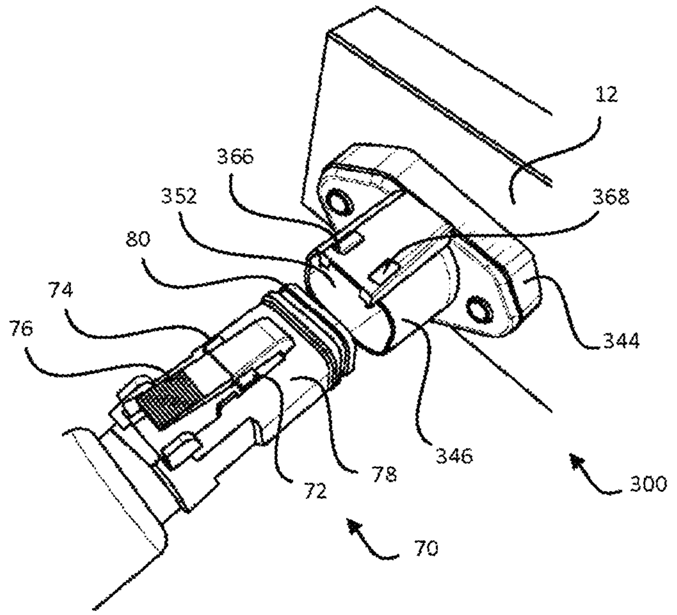
FIG. 19 is a perspective view of a male connector that can be inserted into the electrical connector according to FIG. 15.
Figure 20:
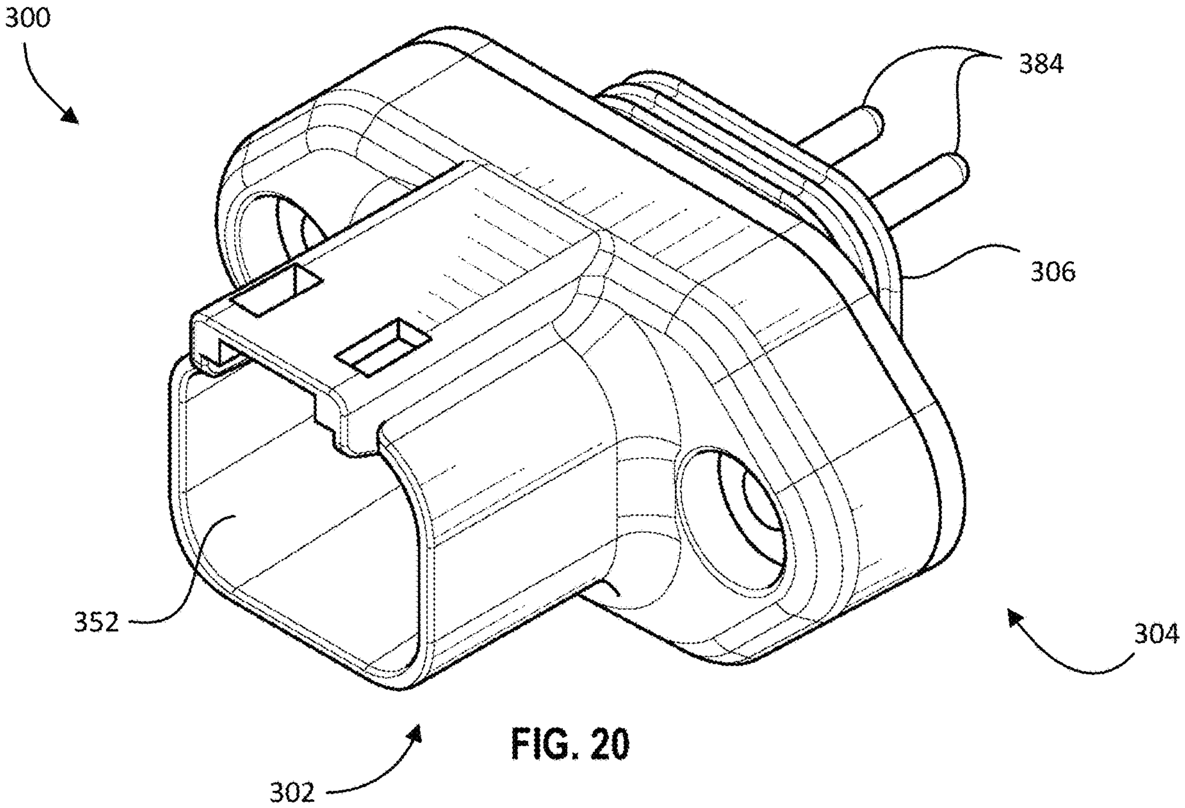
FIG. 20 is a top perspective view of an electrical connector utilizing a two-pin configuration and having a pin plugin configuration according to one configuration of the invention.
Figure 21:
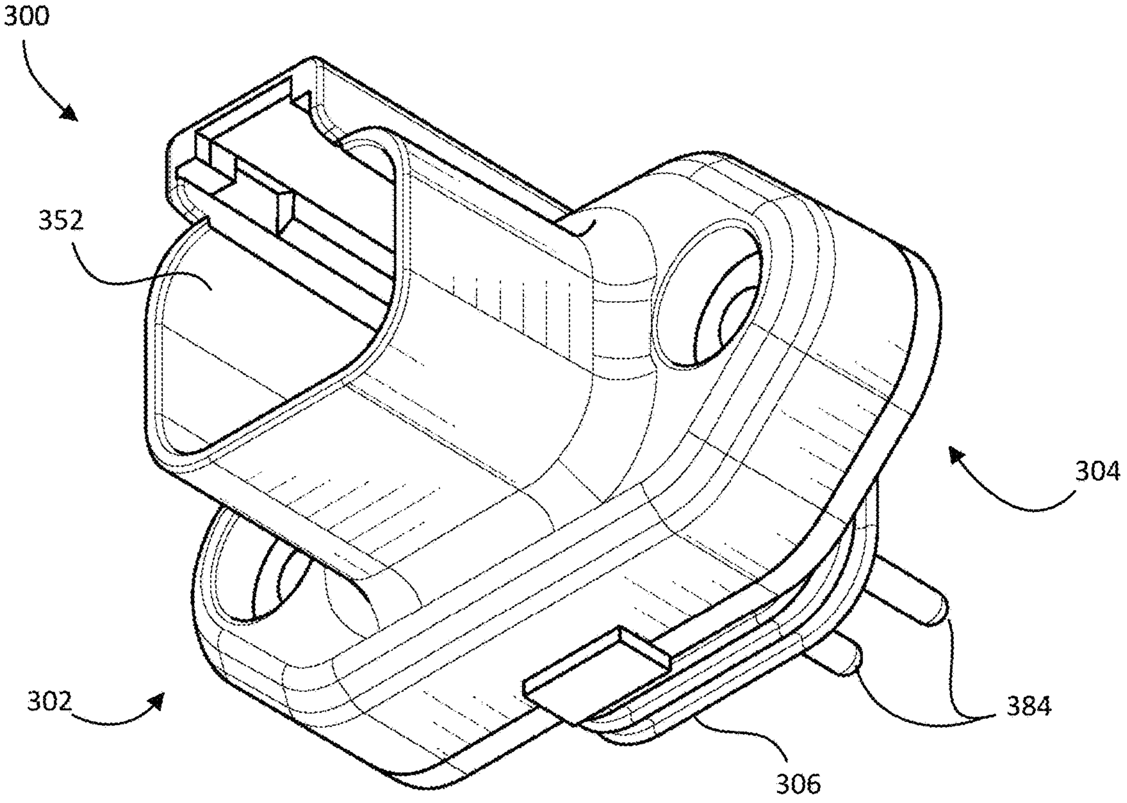
FIG. 21 is a bottom perspective view of the electrical connector according to FIG. 20.
Figure 22:
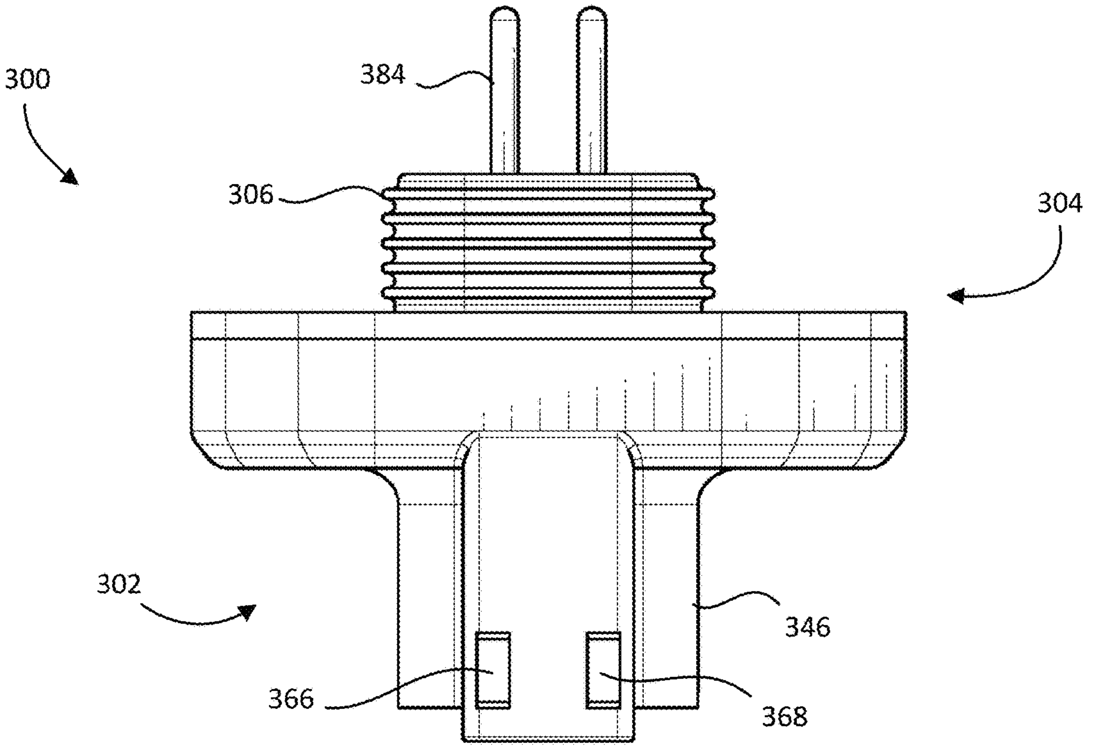
FIG. 22 is a top view of the electrical connector according to FIG. 20.

The connector base 302 also includes flange section 308 that is formed having a perimeter larger than the body portion 306. The flange section 308 includes a contact surface 314 that is designed to lay flat against surface 12 (FIGS. 16, 18 & 19). Additionally, the flange section 308 is formed having two elongated sections opposite each other having holes 316, 318 formed therein for receiving fastening members (not shown) respectively.

The flange section 308 also includes a raised area 324 on an upper surface 326 of the flange section 308. The raised area 324 forms a step at a perimeter of the raised area 324. Also shown in FIGS. 15, 16 & 18 are pins 332, which extend from holes 334 in the raised area 324.

The flange section 308 further includes a shoulder 328 formed around a perimeter 330 of the flange section 308. The shoulder 38 is formed as a step as can be seen in FIGS. 15 & 16.

In one configuration, the entire connector base 302 is formed as a single integral piece of elastic material.

The connector base 302 and the connector body 304 are keyed such that the connector body 304 can only be attached to the connector base 302 in one direction ensuring that the electrical connector 300 forms a proper seal between the two pieces. The connector body 304 includes a key (not shown) that is designed to interact with a corresponding key 372 formed on connector base 302.

Electrical conductors 336, which may comprise copper (Cu) stranded conductors, are connected to pins 332. In one configuration, the connection between the electrical conductors 336 and pins 332 is formed by soldering. Also shown is an area where electrical insulation 338 is removed from the electrical conductors 336 to form a section of bare wire 340. The bare wire may have a solder applied to it so that the section of bare wire effectively becomes a "solid" wire where the solder is applied. The pins 332, extend through openings 334 to extend substantially perpendicular to the raised area 324, and the area of "solid" wire and the location where the electrical conductor 336 is soldered to the end of the pin 332 is positioned within the interior of the body portion 306.

Also shown in FIG. 15 is spacer 354 that includes openings 356 designed to receive electrical conductors 336. The exterior surface of spacer 354 includes a series of upstanding ridges 358 that are designed to interact with an inner surface of a cavity (not shown) in body portion 306. Spacer 354 comprises the elastic material as described in connection with connector base 302. The electrical conductors are threaded through the openings 356 with the pins 332 extending therefrom. Spacer 354 is then inserted into the cavity (not shown) in body portion 306 such that the pins 332 are threaded through openings 334 of raised area 324.

In one configuration, an epoxy which may comprise a material as previously described, may be applied to the interior space of the body portion 306 to completely fill up any space left around the ends of the pins, the soldered joint, the "solid" wire, and the transition to the stranded wire. Additionally, the epoxy may be applied to completely cover the end of spacer 354.

Referring now to FIGS. 15 & 17-19, the connector body 304 is variously illustrated. The connector body 304 is detachable from the connector base 302. In one configuration, the connector body 304 is formed of aluminum, however, it is contemplated that other metal materials may effectively be utilized.

The connector body 304 comprises a flange portion 344 and a raised section 346. The flange portion 344 has a perimeter that is essentially equal to the perimeter of flange section 308 and is designed to sit on top of the flange section 308.

Figure 17:
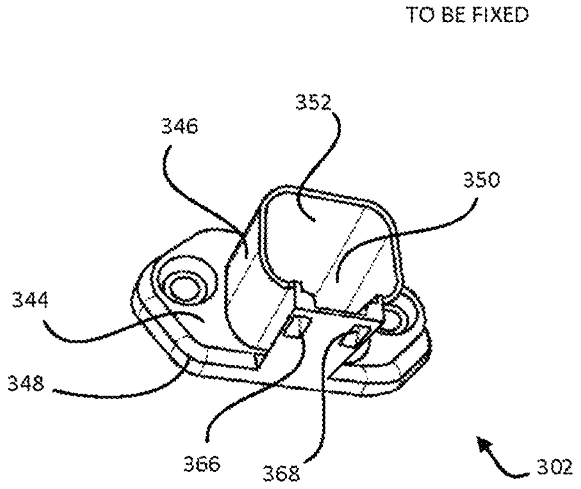
FIG. 17 is a perspective view of the connector body according to FIG. 15.

Referring now to FIG. 17, an upstanding wall 348 extends around the perimeter of flange portion 344. When the flange portion 344 is fit over top of the flange section 308, the upstanding wall 348 interacts with the shoulder 328 to form a second seal around an outer edge of connector base 302 and connector body 304 for the electrical connector 300.

Also illustrated in FIG. 17 is shoulder 350 extends around a proximal end of a cavity 352 formed by raised section 346. When the flange portion 344 is fit over top of the flange section 308, an outer edge of raised area 324 interacts with shoulder 350 to form a third seal between an outer edge of the cavity 352 of raised section 346 and the and the outer edge of raised area 324 of flange section 308 for the electrical connector 300.

A locking mechanism (FIGS. 15, 17-19) is variously illustrated comprising a channel 364 formed in the raised section 346, which is provided with two openings 366, 368, provided therein. These two openings 366, 368 may be provided as elongated channels and are designed to interact with two protrusions 72, 74 formed on an arm 76 provided on a male connector 70.

The male connector 70 may be provided with an exterior surface 78 that may include at least one or more O-ring(s) 80 that can interact with an interior surface of cavity 352 formed by raised section 346. Arm 76 is designed to engage with channel 364 formed in the raised section 346. When the male connector 70 is fully advanced into electrical connector 300, the protrusions 72, 74 will interlock with openings 366, 368 forming a lock such that the male connector 70 cannot be withdrawn without pressing downward on arm 76 to disengage the protrusions 72, 74 from openings 366, 368.

An end face (not shown) of male connector 70 is provided with two receptacles (not shown) that are designed to receive pins 332. In this configuration, there are two pins 332 and four corresponding receptacles (not shown).

Referring now to FIGS. 20-23, an alternate configuration of the device described in connection with FIGS. 15-18 is provided. The electrical connector 300 is structurally similar to the two-pin configuration previously described, however, rather than having electrical conductors 336, 338 extending from the body portion 306, the configuration in FIGS. 20-23 illustrates pins 384 extending from an end face of the body portion 306.

Figure 23:
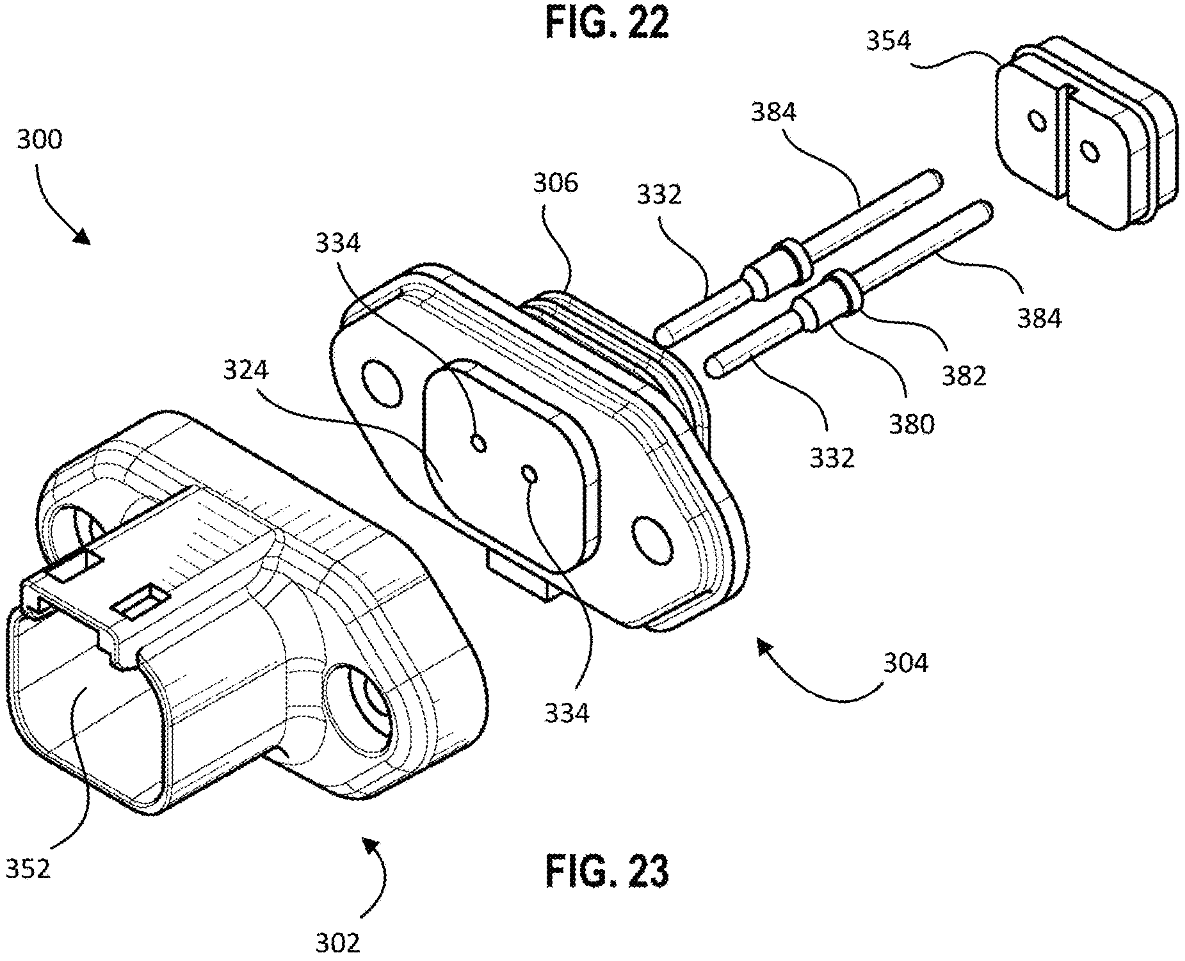
FIG. 23 is a top perspective exploded view of the electrical connector according to FIG. 20.
Figure 24:
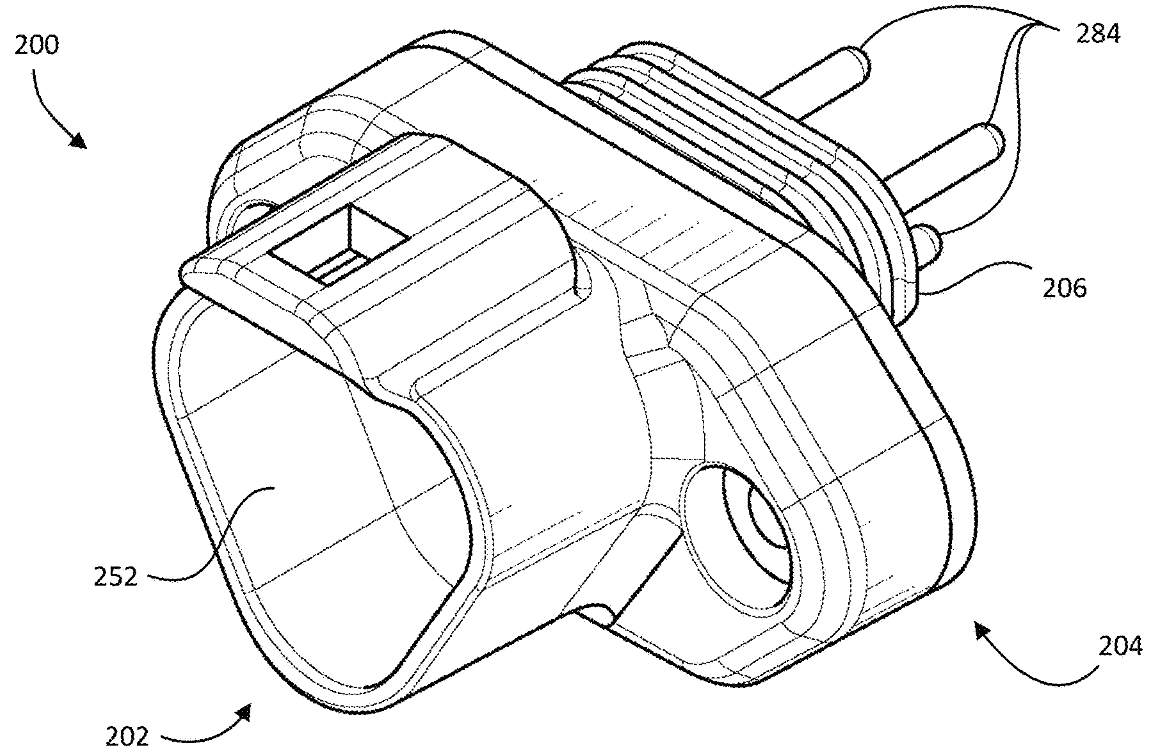
FIG. 24 is a top perspective view of an electrical connector utilizing a three-pin configuration and having a pin plugin configuration according to one configuration of the invention.
Figure 25:
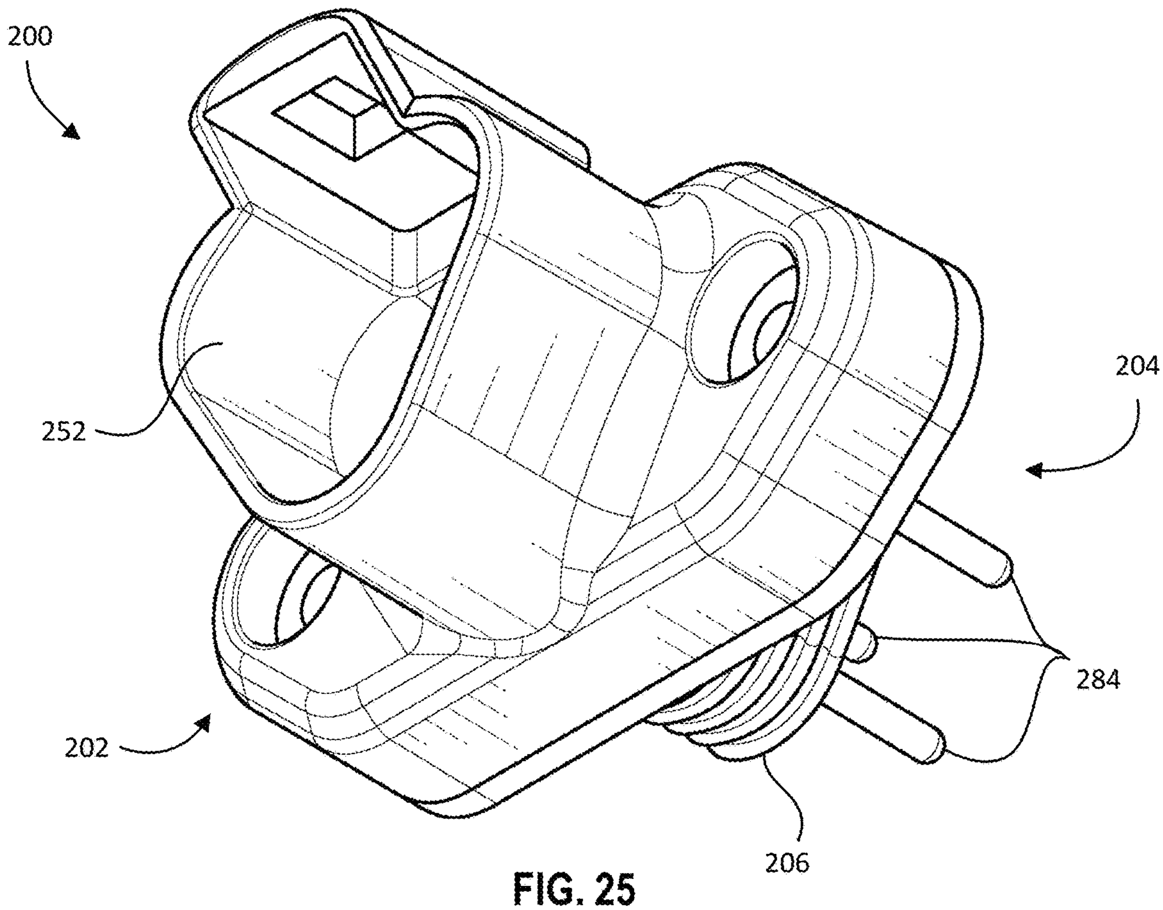
FIG. 25 is a bottom perspective view of the electrical connector according to FIG. 24.
Figure 26:
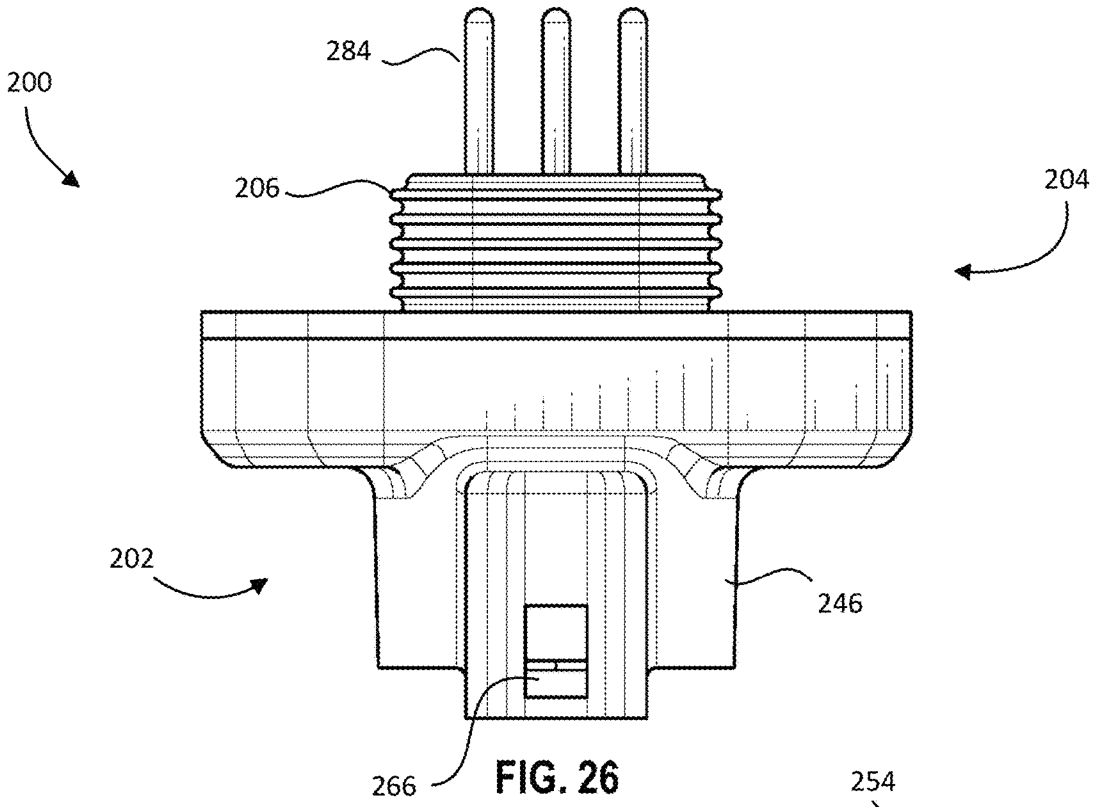
FIG. 26 is a top view of the electrical connector according to FIG. 24.

As can be seen with reference to FIG. 23, pins 332 are insertable through holes 334 in the raised area 324. The pins 332 each comprise a seat 380 having a flange 382 that is designed to sit against an underside of hole 334 to securely hold the pin 332 in the hole 334 when the spacer 354 is fully inserted.

The configuration in FIG. 23 differs from the configuration in FIG. 15 in that, rather than providing electrical conductors extending through the spacer 354, pins 384 are provided. Once the pin structures are inserted and the spacer 354 is fully inserted into the connector base 302, an epoxy can be applied to fill in any air space in the interior of body portion 306.

Referring now to FIGS. 24-27, an alternate configuration of the device described in connection with FIGS. 10-14 is provided. The electrical connector 200 is structurally similar to the three-pin configuration previously described, however, rather than having electrical conductors 236, 238 extending from the body portion 206, the configuration in FIGS. 24-27 illustrates pins 284 extending from an end face of the body portion 206.

Figure 27:
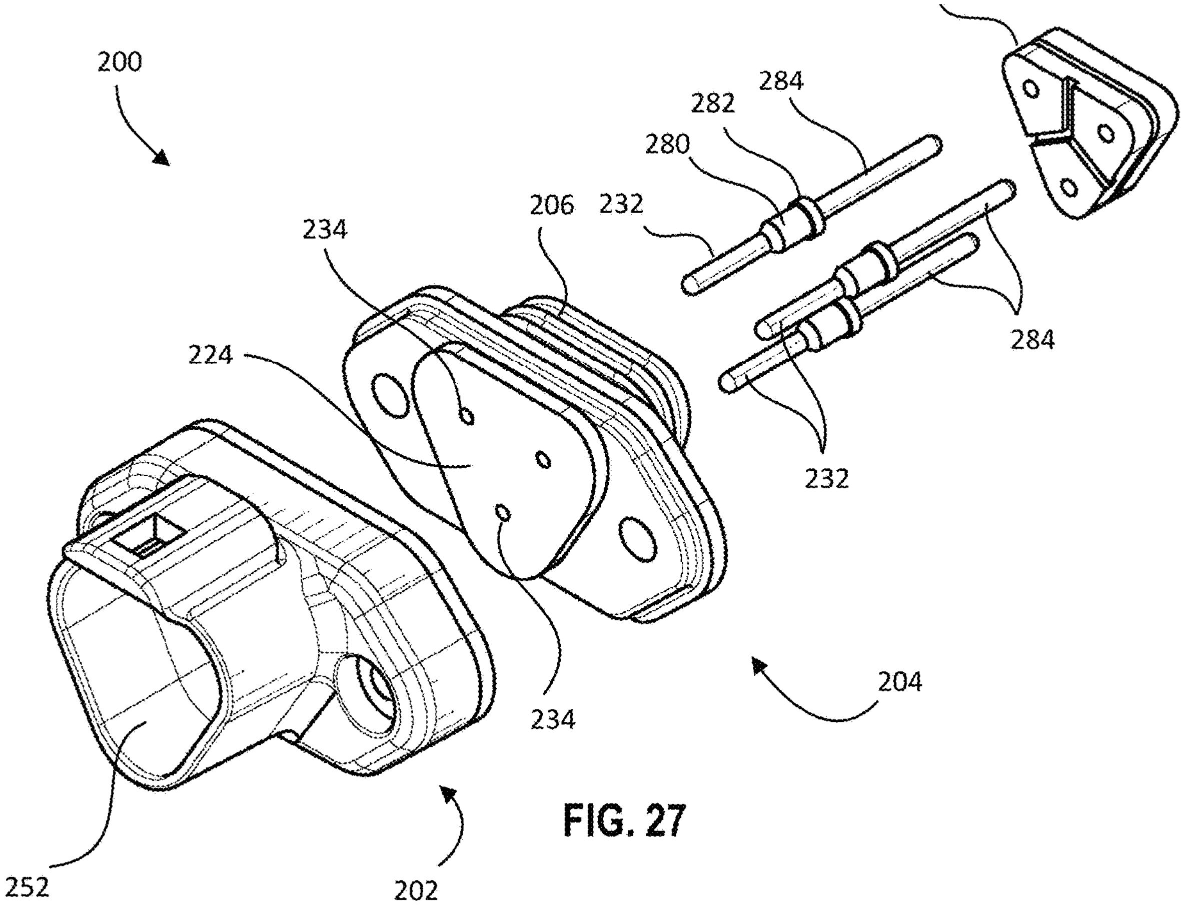
FIG. 27 is a top perspective exploded view of the electrical connector according to FIG. 24.
Figure 28:
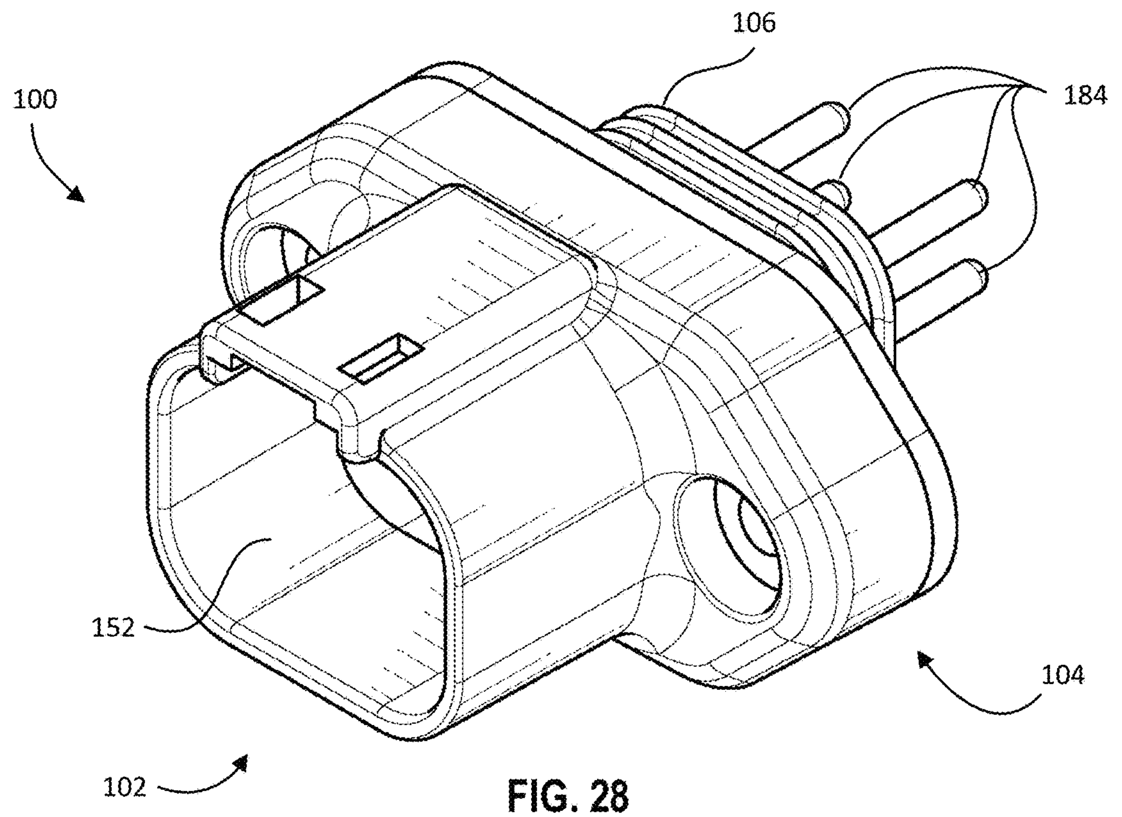
FIG. 28 is a top perspective view of an electrical connector utilizing a four-pin configuration and having a pin plugin configuration according to one configuration of the invention.
Figure 29:
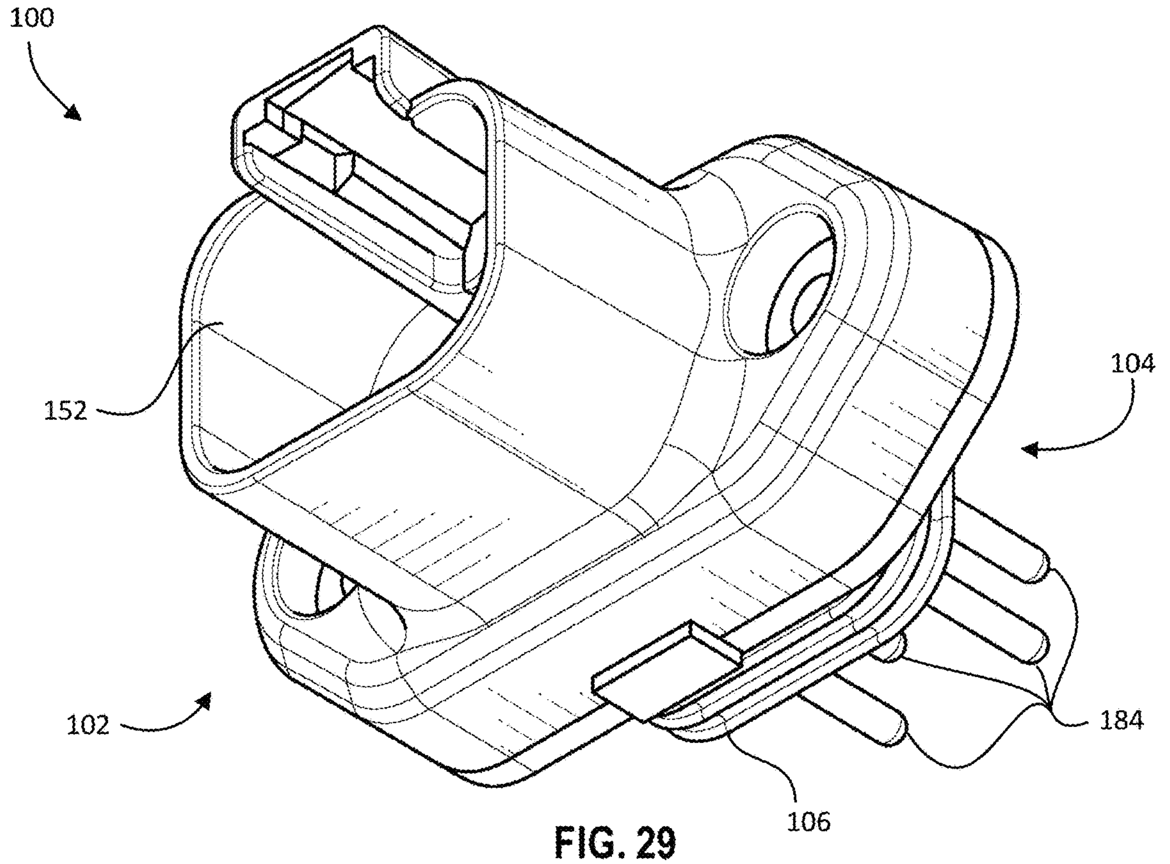
FIG. 29 is a bottom perspective view of the electrical connector according to FIG. 28.
Figure 30:
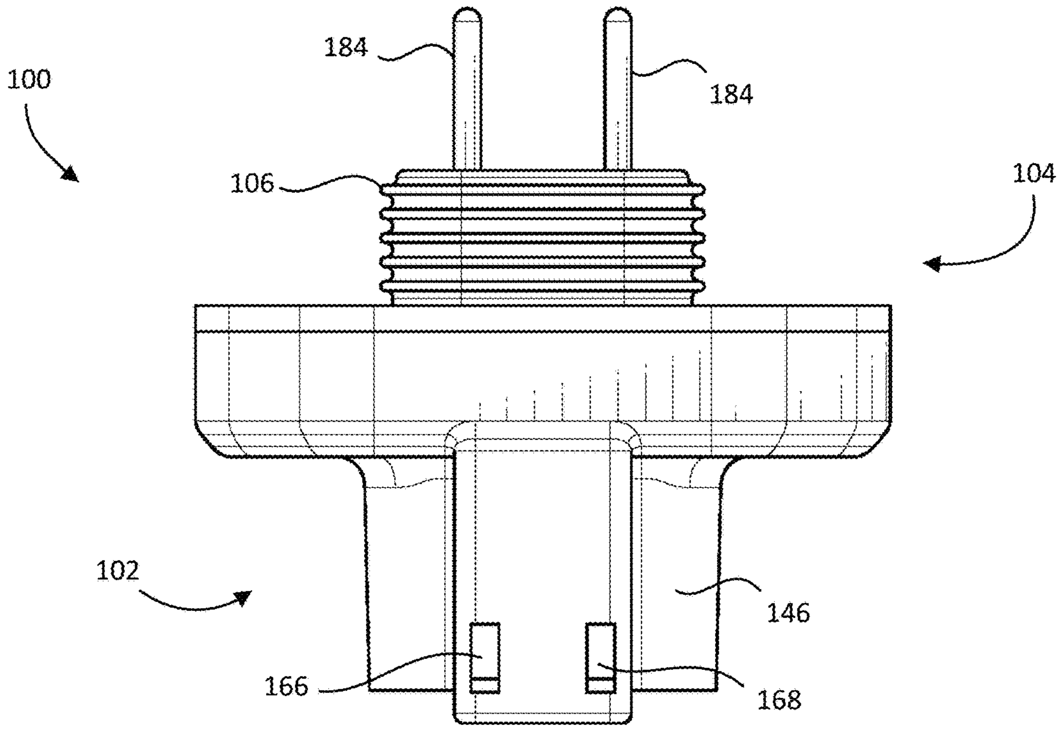
FIG. 30 is a top view of the electrical connector according to FIG. 28.

As can be seen with reference to FIG. 27, pins 232 are insertable through holes 234 in the raised area 224. The pins 232 each comprise a seat 280 having a flange 282 that is designed to sit against an underside of hole 234 to securely hold the pin 232 in the hole 234 when the spacer 254 is fully inserted.

The configuration in FIG. 27 differs from the configuration in FIG. 10 in that, rather than providing electrical conductors extending through spacer 254, pins 284 are provided. Once the pin structures are inserted and spacer 254 is fully inserted into connector base 202, an epoxy can be applied to fill in any air space in the interior of body portion 206.

Referring now to FIGS. 28-33, an alternate configuration of the device described in connection with FIGS. 1-9 is provided. The electrical connector 100 is structurally similar to the four-pin configuration previously described, however, rather than having electrical conductors 136, 138 extending from the body portion 106, the configuration in FIGS. 28-33 illustrates pins 184 extending from an end face of the body portion 106.

Figure 31:
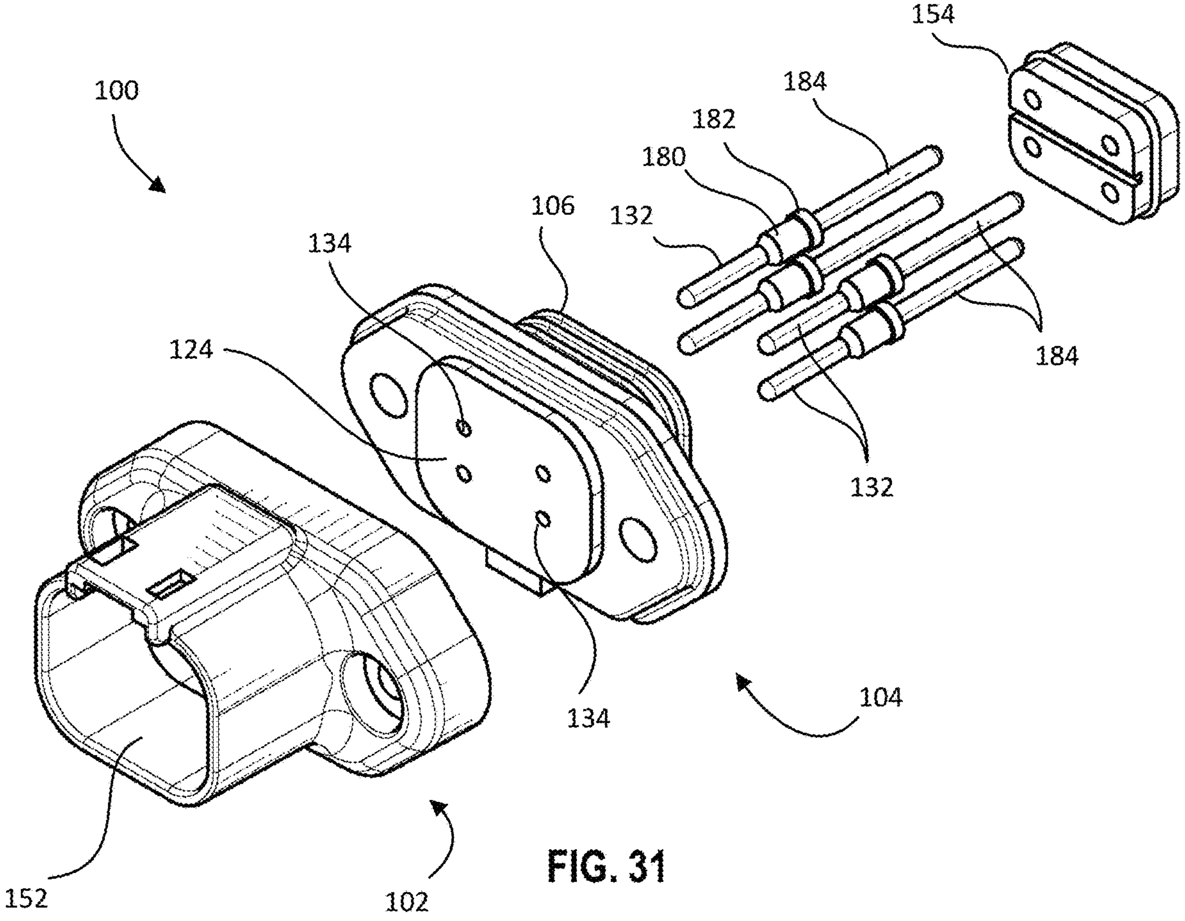
FIG. 31 is a top perspective exploded view of the electrical connector according to FIG. 28.

As can be seen with reference to FIG. 31, the pins 132 are insertable through holes 134 in the raised area 124. The pins 132 each comprise a seat 180 having a flange 182 that is designed to sit against an underside of hole 134 to securely hold the pin 132 in the hole 134 when the spacer 154 is fully inserted.

The configuration in FIG. 31 differs from the configuration in FIG. 1 in that, rather than providing electrical conductors extending through spacer 154, pins 184 are provided. Once the pin structures are inserted and spacer 154 is fully inserted into connector base 102, an epoxy can be applied to fill in any air space in the interior of body portion 106.

Figure 32:
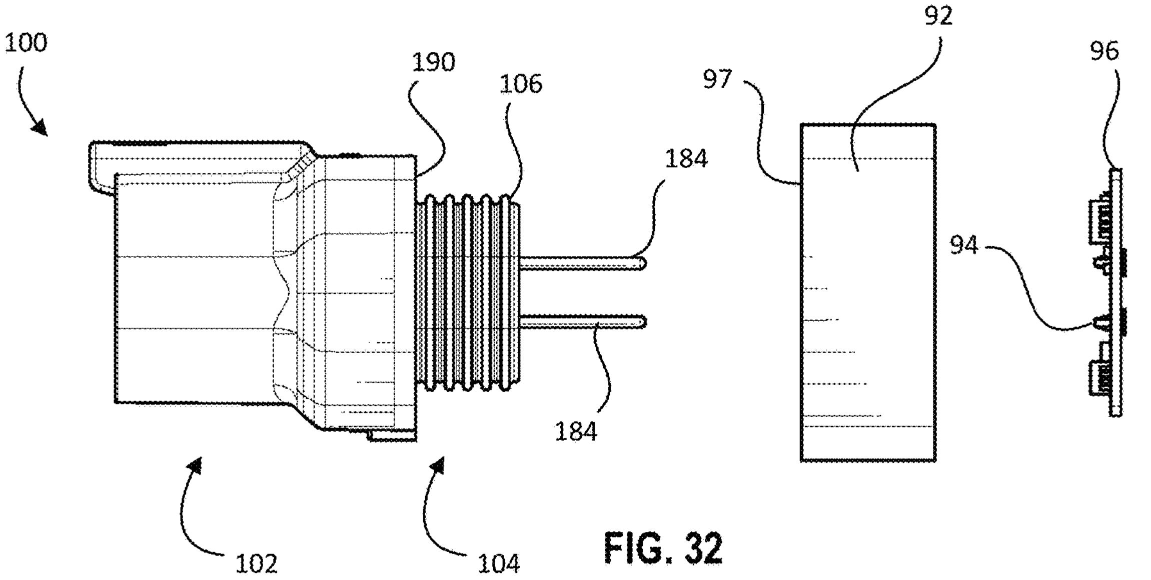
FIG. 32 is a side view of an electrical connector according to FIG. 28 illustrating a side of the housing of a light fixture and a circuit board that includes receptacles corresponding to the pins extending from the insertion section.
Figure 33:
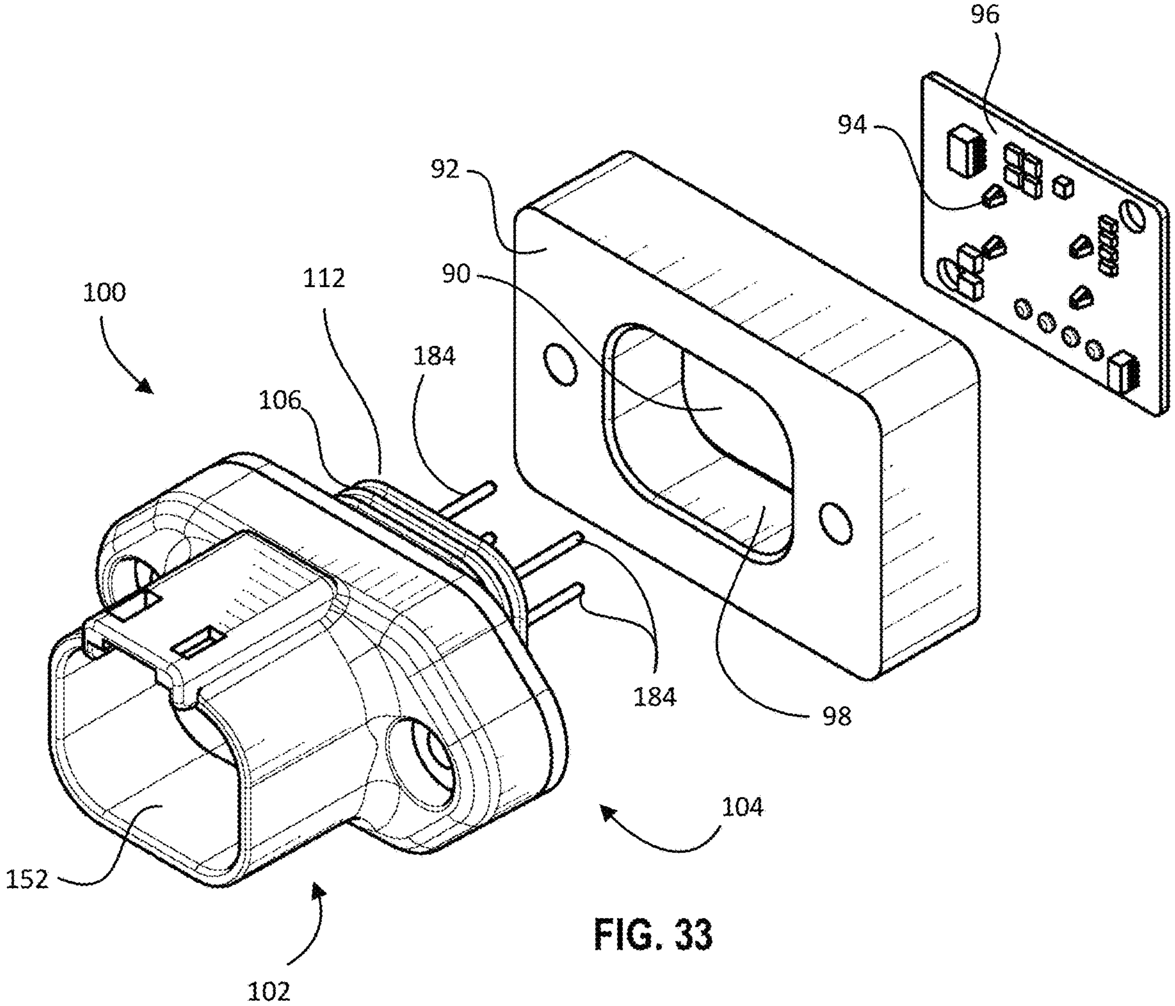
FIG. 33 is a top perspective view of an electrical connector according to FIG. 32 illustrating the socket configuration and a circuit board that includes receptacles corresponding to the pins extending from the insertion section.

Referring now to FIGS. 32 and 33, a socket 90 provided in a housing 92 (only a portion of the housing 92 is shown) is illustrated along with the body portion 106 that is insertable into the socket 90. Pins 184 extend from body portion 106 and are designed to interact with openings 94 (in this example there are four openings) comprising a receptacle that in this configuration is positioned on printed circuit board (PCB) 96. While the openings 92 are shown in this configuration on PCB 96, it is contemplated that the receptacle could comprise a separate plug configuration provided in socket 90 that is electrically connected to PCB 94. Additionally, the number of openings will correspond to the connector that is used (i.e., a two-pin, three-pin or four-pin configuration). While 2, 3 and 4 pin configurations are described, it is contemplated that any number of pins may effectively be used without deviating from the invention.

Body portion 106 includes an exterior surface 110, that includes a series of upstanding ridges 112. The upstanding ridges 112 are formed of elastic material and are designed to be slightly larger in diameter than an inner surface 98 of socket 90. In this way, the upstanding ridges 112 deform when the body portion 106 is inserted into the socket 90 forming five separate seals for the electrical connector 100. It should be noted however, that the depth of the socket may be variable and that not all five seals may be needed. For example, the socket could be much shallower than depicted in FIGS. 32 and 33 and only one or two seals may be formed between the inner surface 98 and the upstanding ridge(s).

Also provided on electrical connector 100 is a contact surface 190 (FIG. 32) that is designed to sit flat against an exterior surface 98 of the light fixture housing. The contact surface may be formed of an elastic material such that when the electrical connector is fully inserted into socket 90 a seal is formed between the contact surface 190 and the exterior surface 97 of the light fixture housing. In some configurations, screws may be used to firmly hold the electrical connector 100 in a fully inserted position with socket 90. In other configurations, the screws may not be needed as the seals between the upstanding ridges 112 and the inner surface 98 of the socket as well as the frictional fit of the pins 180 with the openings 92 will create a secure connection. However, in certain applications where vibration may be intense, securing the electrical connector 100 by means of locking mechanism (e.g., screws or the like) is preferable.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A watertight electrical connector comprising:
a connector base including:
a body portion adapted to be inserted into an opening in a surface and forming a seal between an inner surface of the opening and an exterior surface of the body portion;
a flange section adapted to interact with the surface;
a connector body having:
a flange portion adapted to interact with the flange section and form a seal between said connector body and said connector base;
a raised section forming a cavity adapted to receive a male connector;
at least two pins mounted on the flange section;
a spacer holding at least two conductors connected to said at least two pins respectively within an internal space of said body portion;
an epoxy applied to the internal space such that said epoxy creates a seal preventing water from traveling through said body portion;
wherein said connector body is detachablely connectable with said body portion; and
wherein said connector base is detachably connectable with said opening.

2. The watertight electrical connector of claim 1, wherein said at least two pins and said at least two conductors are each formed as a single extended pin structure where each extended pin structure extends through said body portion.

3. The watertight electrical connector of claim 2, wherein each of said at least two pins comprises a seat having a shoulder.

4. The watertight electrical connector of claim 3, wherein said flange section comprises a raised area on a distal surface of said flange section, the raised area including at least two openings extending through said flange section for said at least two pins respectively;
wherein said seat is adapted to engage with an inner surface of the at least two openings extending through said flange section; and
wherein said shoulder is adapted to engage with a surface of said flange section surrounding the opening to preventing said pin from advancing into said opening beyond the shoulder.

5. The watertight electrical connector of claim 4, wherein the pins extend through the at least two opening extending through said flange section and extend beyond a distal surface of the raised area of the flange section; and
wherein the pins extending beyond the distal surface of the raised area are adapted to engage with openings in a distal end of a male connector.

6. The watertight electrical connector of claim 4, wherein when said spacer is advanced into the interior of said body portion, the pins extend through corresponding holes in said spacer and a front edge of said spacer interacts with said shoulder to sandwich the shoulder between the surface of said flange section surrounding the opening and the front edge of said spacer preventing any longitudinal movement of the pins when the spacer is fully inserted into said body portion.

7. The watertight electrical connector of claim 6, wherein multiple upstanding ridges provided on the exterior surface of said spacer interact with the inner surface of said body portion and the epoxy functions as a seal preventing water from passing through said body portion.

8. The watertight electrical connector of claim 4, wherein said flange portion comprises a shoulder adapted to interact with the raised area on the distal surface such that a seal is formed between the cavity and the distal surface of said flange section.

9. The watertight electrical connector of claim 8, wherein the shoulder of said flange portion is formed as a step.

10. The watertight electrical connector of claim 2, wherein each extended pin structure extends beyond a proximal end of said body portion.

11. The watertight electrical connector of claim 10, wherein said opening in the surface comprises a receptacle with at least two openings corresponding to said at least two pins extending from said body portion, wherein when said body portion is fully inserted into the opening, said at least two pins extending from said body portion are fully inserted into said the at least two openings forming an electrical connection between each pin and each opening the pin is inserted into respectively.

12. The watertight electrical connector of claim 11, wherein multiple seals are formed between the inner surface of the opening and the exterior surface of the body portion by multiple upstanding ridges provided on the exterior surface of the body portion interacting with the inner surface of the opening.

13. The watertight electrical connector of claim 11, wherein each opening of the receptacle is electrically connected to a printed circuit board.

14. The watertight electrical connector of claim 13, wherein the opening in the surface comprises a socket in a housing of a light fixture.

15. The watertight electrical connector of claim 1, wherein said flange section has at least one hole adapted to receive a fastening member and said flange portion has at least one opening adapted to receive the fastening member.

16. The watertight electrical connector of claim 1, wherein said raised section of the connector body includes a locking mechanism adapted to interact with an arm associated with a male connecter.

17. The watertight electrical connector of claim 16, wherein said locking mechanism includes at least one opening in the raised section adapted to receive a protrusion on the arm.

18. The watertight electrical connector of claim 16, wherein when the male connector comprises a Deutsch Connector.

19. A watertight electrical connector comprising:

a connector base including:

a body portion adapted to extend into an opening of a surface and forming a seal between an inner surface of the opening and an exterior surface of the body portion;

a flange section adapted to engage with the surface and having at least one hole adapted to receive a fastening member;

a connector body having:

a flange portion adapted to interact with the flange section, said flange portion having at least one opening adapted to receive the fastening member;

a raised section forming a cavity adapted to receive a connector;

at least two pins extending at least partially through the body portion and into the cavity and adapted to be coupled to corresponding conductors;

the at least two pins held a fixed distance from each other such that the at least two pins are rigidly maintained in the cavity for engagement with a connector adapted to be inserted into the cavity;

wherein said connector body is detachablely connectable with said body portion.

20. The watertight electrical connector of claim 19, wherein the connector base comprises a rigid material.

21. The watertight electrical connector of claim 19, wherein said flange portion comprises an upstanding wall extending around a perimeter of said flange portion; and said flange section is adapted to interact with the upstanding wall such that a seal is formed between said flange portion and said flange section.

22. The watertight electrical connector of claim 19, wherein said flange section and said flange portion each have at least two openings adapted to receive respective fastening members.

23. The watertight electrical connector of claim 19, further comprising a raised section of the connector body having a locking mechanism adapted to interact with an arm associated with a connecter adapted to be inserted into the cavity.

24. The watertight electrical connector of claim 23, wherein the locking mechanism includes at least one opening in the raised section adapted to receive a protrusion on the arm.

25. The watertight electrical connector of claim 24, wherein when the connector is inserted into the cavity, the arm is deformed inward relative to the connector, and when the connector is fully advanced into the cavity the arm deflects outward relative to the connector such that the protrusion engages with the at least one opening in the raised section to lock the connector with the cavity.

26. The watertight electrical connector of claim 23, wherein when the connector comprises a Deutsch Connector.

27. The watertight electrical connector of claim 19, wherein the seal between the inner surface of the opening and the exterior surface of the body portion is formed by at least one upstanding ridge provided on the exterior surface of the body portion interacting with the inner surface of the opening.

28. The watertight electrical connector of claim 19, wherein said connector body is formed of an elastic material.

29. The watertight electrical connector of claim 28, wherein the elastic material is selected from the group consisting of: thermal plastic rubber (TPR), neoprene, thermoplastics elastomer (TPE), silicon, and flexible polyvinyl chloride (PVC).

30. The watertight electrical connector of claim 19, wherein said connector base is formed of an elastic material.

31. The watertight electrical connector of claim 30, wherein the elastic material is selected from the group consisting of: thermal plastic rubber (TPR), neoprene, thermoplastics elastomer (TPE), silicon, and flexible polyvinyl chloride (PVC).

32. The watertight electrical connector of claim 19, wherein the at least two pins comprise three or four pins, each pin having a corresponding conductor affixed thereto.

* * * * *